(12) United States Patent
Hennacy et al.

(10) Patent No.: US 10,827,209 B2
(45) Date of Patent: Nov. 3, 2020

(54) METHODS AND APPARATUS FOR WATERMARK OUTAGE DETECTION

(71) Applicant: The Nielsen Company (US), LLC, New York, NY (US)

(72) Inventors: Kenneth Albert Hennacy, Columbia, MD (US); Girish Khavasi, Lake Hiawatha, NJ (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 270 days.

(21) Appl. No.: 16/051,091

(22) Filed: Jul. 31, 2018

(65) Prior Publication Data

US 2020/0045353 A1 Feb. 6, 2020

(51) Int. Cl.
*H04N 21/8358* (2011.01)
*H04N 21/24* (2011.01)
*H04N 21/234* (2011.01)
*H04N 21/2389* (2011.01)

(52) U.S. Cl.
CPC ... *H04N 21/2407* (2013.01); *H04N 21/23424* (2013.01); *H04N 21/23892* (2013.01); *H04N 21/2404* (2013.01); *H04N 21/8358* (2013.01)

(58) Field of Classification Search
CPC .................................................. H04N 21/8358
See application file for complete search history.

(56) References Cited

U.S. PATENT DOCUMENTS

| | | |
|---|---|---|
| 6,252,972 B1 | 6/2001 | Linnartz |
| 6,477,431 B1 | 11/2002 | Kalker et al. |
| 6,901,514 B1 | 5/2005 | Iu et al. |
| 7,634,660 B2 | 12/2009 | Mihcak et al. |
| 8,190,939 B2 | 5/2012 | Fields, Jr. et al. |
| 8,209,567 B2 | 6/2012 | Cohen et al. |
| 8,717,907 B2 | 5/2014 | Bergquist et al. |
| 2011/0123062 A1* | 5/2011 | Hilu ...................... G06Q 30/02 382/100 |

OTHER PUBLICATIONS

Fu et al., "Online Temporal-Spatial Analysis for Detection of Critical Events in Cyber-Physical Systems," IEEE International Conference on Big Data, 2014, 6 pages.

(Continued)

*Primary Examiner* — Michael H Hong
(74) *Attorney, Agent, or Firm* — Hanley, Flight & Zimmerman, LLC

(57) ABSTRACT

Methods, apparatus, systems and articles of manufacture are disclosed for watermark outage detection. Example methods include evaluating an onset time and duration of a detected watermark outage based on a model of expected watermark outages to determine whether the detected watermark outage corresponds to at least one of the expected watermark outages represented in the model. Example methods further include generating an alert in response to determining the detected watermark outage does not correspond to at least one of the expected watermark outages included in the model, and suppressing the alert in response to determining the detected watermark outage corresponds to the at least one of the expected watermark outages represented in the model.

20 Claims, 9 Drawing Sheets

(56) References Cited

OTHER PUBLICATIONS

Bell, "Identifying Outages with Argos, Uber Engineering's Real-Time Monitoring and Root-Cause Exploration Tool," Uber, Nov. 24, 2015, 11 pages.
Hoque et al., "Holmes: A Comprehensive Anomaly Detection System for Daily In-home Activities," IEEE International Conference on Distributed Computing in Sensor Systems, Jun. 2015, 12 pages.
Bhaya et al., "Review Clustering Mechanisms of Distributed Denial of Service Attacks," Journal of Computer Science: 10(10), 2014, 10 pages.
General Electric, "Advanced Sensors and Monitoring & Diagnostics (M&D) for Gas Turbines," Apr. 24, 2012, 30 pages.

* cited by examiner

US 10,827,209 B2

METHODS AND APPARATUS FOR WATERMARK OUTAGE DETECTION

FIELD OF THE DISCLOSURE

This disclosure relates generally to watermark encoding, and, more particularly, to methods and apparatus for watermark outage detection.

BACKGROUND

Some media monitoring applications embed watermarks into media signals to enable subsequent detection of the media conveyed by the media signals by decoding the watermarks in a presented media signal. For example, a broadcasting entity (e.g., a radio broadcaster, a television broadcaster, an internet streamer, etc.) may encode watermarks into media signals. A media monitoring entity may then detect the watermarks in the media signals during monitoring activity and accurately determine, based on identification information associated with the watermark, that the media (e.g., a television show, a film, a commercial etc.) corresponding to the media signals was presented. Reliable and consistent encoding of the watermarks in the presented media signals ensures accurate metrics of exposure to the media corresponding to the media signals.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
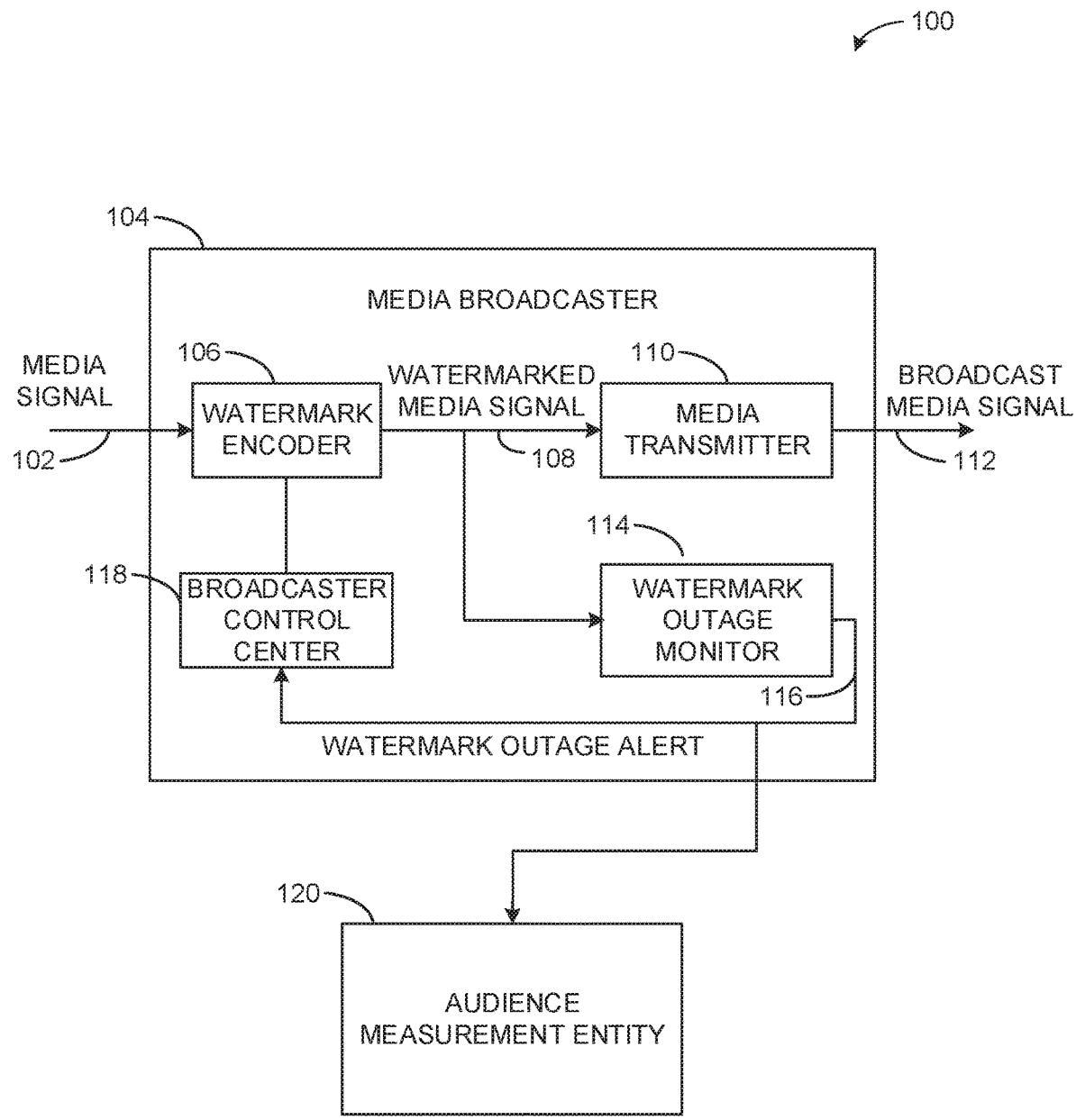
FIG. 1 is a block diagram of an example environment for monitoring of watermarked media signals in accordance with the teachings of this disclosure.

Watermarking is a technique used to identify media such as television broadcasts, radio broadcasts, advertisements (television and/or radio), downloaded media, streaming media, prepackaged media, etc. Existing watermarking techniques identify media by encoding one or more codes (e.g., one or more watermarks) including media identifying information and/or an identifier that may be mapped to media identifying information, into an audio and/or video component. In some examples, the audio or video component is selected to have a signal characteristic sufficient to hide the watermark. As used herein, the terms "code" or "watermark" are used interchangeably and are defined to mean any identification information (e.g., an identifier) that may be inserted or encoded in the audio or video of media (e.g., a program or advertisement) for the purpose of identifying the media or for another purpose such as tuning (e.g., a packet identifying header). As used herein "media" refers to audio and/or visual (still or moving) content and/or advertisements. Further, as used herein, the term "media" includes any type of content and/or advertisement delivered via any type of distribution medium. Thus, media includes television programming or advertisements, radio programming or advertisements, movies, web sites, streaming media, etc. To identify watermarked media, the watermark(s) are extracted and used to access a table of reference watermarks that are mapped to media identifying information.

In some examples, a monitoring entity (e.g., the Nielsen Company (US), LLC) can monitor media presentations to monitor exposure to advertisements, monitor content consumption (e.g., exposure to a television show, exposure to a radio program, etc.), determine viewership/listenership demographics, etc. Such a monitoring entity can monitor media signals to quickly and accurately identify media based on encoded watermarks in the signals. As such, monitoring entities typically prefer that watermarks are consistently encoded in media signals to enable accurate monitoring.

In some examples, watermarks are encoded by a media broadcaster prior to broadcasting the media signals. In some examples, the watermarks can be encoded by a different entity in the media distribution process (e.g., a content provider, a measurement entity, a local broadcaster, a cable broadcaster, an online distributor, etc.). Due to the variety of different locations at which watermarks can be encoded, and the variety of different entities that can encode watermarks, it can be difficult to ensure reliable and consistent watermark encoding. One method of improving the overall reliability is to implement alarms that indicate to the operator when watermarks are not being encoded. Conventionally, an alarm setting is implemented at encoding locations (e.g., at a media broadcaster, etc.) to initiate an alarm and thereby alert an operator that the media is not being encoded with watermarks. However, media signals can include portions, such as commercials, that are intentionally not encoded with watermarks. Hence, such conventional techniques can trigger unwanted false alarms, which can lead to a "cry wolf" effect, where alarms are no longer trusted as indicating an actual watermark encoding issue that requires attention. While some alarms are configured with customizable tolerances, which enable a user to set a minimum outage duration to trigger an alarm, the durations of watermark outages can vary, which reduces the effectiveness of a selected tolerance.

A technique is needed that can identify whether a watermark outage is expected (e.g., due to a commercial break, due to programming that is intentionally not encoded with watermarks, etc.) or a watermark outage is unexpected (e.g., due to an error in watermark encoding, due to an overall error in media signal transmission, etc.). As used herein, the term watermark outage refers to a portion of a media signal that is not encoded with watermarks.

Example methods, apparatus, systems and articles of manufacture (e.g., physical storage media) to dynamically analyze media signals and accurately trigger watermark encoding outage alarms for unexpected (e.g., unintentional) watermark outages are disclosed herein. Some example watermark outage monitoring techniques disclosed herein include modeling the presence of watermarks in media signals to determine patterns associated with watermark encoding. In some examples, onset times of watermark outages and/or durations of watermark outages can be modeled and utilized to identify expected and/or unexpected watermark outages. For example, during an hour-long television broadcast, there may be several expected watermark outages that occur at regular intervals (e.g., commercial breaks, infomercials, public service announcements, etc.) with regular durations (e.g., two-minute commercial break, one-minute public service announcement, etc.). It would be undesirable for these expected watermark outages to trigger alarms. By modeling an onset time of these watermark outages, as well as a duration of these watermark outages, disclosed example watermark outage monitoring systems can be implemented to trigger alarms when an unexpected watermark outage occurs (e.g., due to an error in the watermark encoding process, a failure of the watermark encoding system, etc.), but not trigger an alarm when an expected watermark outage occurs (e.g., during times when commercials and other non-watermarked media is typically broadcast). An onset time can be, for example, a discrete value associated with a time at which a watermark outage occurs (e.g., 3:32 PM, 16:32, etc.) or an elapsed time associated with an amount of time that has passed since the last watermark outage (e.g., 33 minutes since the last watermark outage). For example, if commercial breaks without watermark encoding typically happen at fifteen-minute intervals within a program (e.g., fifteen minutes past the hour, thirty minutes past the hour, forty-five minutes past the hour, etc.), and a watermark outage is detected at eight minutes past the hour, a disclosed example watermark outage monitor can determine that the detected watermark outage does not match an expected watermark outage represented in the model and thereafter issue a watermark outage alert.

Some disclosed example watermark outage monitoring techniques determine whether a detected watermark outage is an expected or unexpected watermark outage by analyzing a previous watermark outage onset time to determine if a detected watermark outage represents an expected transition between watermark outages. In some examples, if the onset time represents an elapsed time since the watermark outage, the onset time itself may be utilized to determine if a detected watermark outage represents an expected transition between watermark outages (e.g., without referencing a previous watermark outage onset time). For example, one type of television program may have a series of three expected watermark outages. The first outage may occur at ten minutes past the hour, which is expected to be followed by the second watermark outage at thirty minutes past the hour, which is finally expected to be followed by the third watermark encoding outage at fifty minutes past the hour.

Another type of television program can have a series of three expected watermark outages, with the first occurring at ten minutes past the hour, followed by the second watermark outage at twenty-five minutes past the hour, followed by the third expected watermark encoding outage at fifty minutes past the hour. In this example, if an outage is detected at thirty minutes past the hour, and the previous outage was detected at twenty-five minutes past the hour, this may be an unexpected watermark outage, as this transition (from an outage at twenty-five minutes to an outage at thirty minutes) does not correspond with the model's expected watermark outage state transitions.

In some disclosed examples, a duration of a detected watermark outage can be compared to the model to determine if the detected watermark outage is an expected watermark outage. For example, if a watermark outage continues for seven minutes, when previously seen watermark outages represented by the model have durations of four or five minutes, the watermark outage monitor can decide to issue an alarm.

In some examples, a Markov model is utilized to analyze watermark encoding data. Specifically, the Markov model can analyze the onset of the watermark outages (e.g., the times at which the watermark outages begin, etc.). For example, a Markov model can be continually trained and updated based on watermark encoding data at a broadcaster. The Markov model can represent probabilities of a watermark outage occurring at any time in the watermark encoding data based on a previous watermark outage or an elapsed time in a media signal (e.g., fifteen minutes into a television program, etc.). In some examples, the Markov model is established based on an initial training period, with an occurrence of a new state (e.g., a watermark outage that does not correspond to an existing state in the model, etc.) resulting in a watermark outage alarm. The states of the Markov model can be based on onset times associated with the watermark outages. New states can be incorporated as expected outage states into an updated model when they recur with a frequency satisfying (e.g., meeting or exceeding) a threshold, indicating that the new state may be a new expected watermark outage (e.g., a new commercial onset time, etc.).

In addition to states, state transitions (e.g., corresponding to sequential pairs of watermark outages represented in the model) can be analyzed and included in the model. State transitions can be associated with probabilities of an occurrence of the transition. For example, the probability of a state transition may increase in the model if more occurrences of that state transition are observed. In some examples, an initial outlier watermark outage associated with a new state transition can, over time, become an expected watermark outage if the same state transition occurs enough times such that the probability of the state transition satisfies an occurrence threshold. Similarly, when a new state (e.g., a new onset time for a watermark outage) is observed, it may initially be an outlier watermark outage that triggers an alarm. As used herein, an outlier watermark outage refers to an outage with characteristics that are not expected by the model (e.g., an unexpected onset time, an unexpected transition between watermark outages, an unexpected duration, etc.), and may indicate a watermark outage that is unexpected (e.g., unintentional). However, if the same state occurs often enough to satisfy an occurrence threshold, it may be represented in the model as an expected outage state thereafter.

In some examples, clustering techniques (e.g., k-means clustering using a gap statistic method to determine the number of clusters) can be used to establish a second model, or a second transition state of the existing model, based on watermark outage durations and/or watermark outage onset times (e.g., elapsed times since previous watermark outages or discrete times). Such techniques are leveraged to take into account the observation that intentional watermark outages typically have relatively consistent (e.g., but not exactly equal) durations with minor variations (e.g., a due to lack of reception of the tuner from low power operation during nighttime of an AM station, etc.). Watermark encoding data can be utilized to train the model to recognize clusters of watermark outage durations, and subsequently issue outage alarms when a watermark outage occurs that has a duration and/or an onset time, or a combination of a duration and onset time, that do not fall into one of the clusters as defined by sampled cluster and gap sizes. In some examples, once a new watermark outage duration occurs with a frequency beyond an occurrence threshold, indicating that the watermark outages having the new duration may not be unintentional watermark outages (e.g., outlier watermark outages) but rather intentional watermark outages, the model can be updated accordingly.

In some examples, additional or alternative modeling techniques can be implemented to characterize watermark outages. For example, additional properties of a watermark outage (e.g., audio characteristics, such as silence and/or presence of a wrong code during the outage), can be utilized to enhance the accuracy and granularity of the model, for example, by filtering them out or defining a state transition of the model in terms of multiple properties.

These and other techniques, methods, apparatus, systems and articles of manufacture to dynamically analyze media signals for watermark outage analysis and to issue accurate watermark outage alarms are disclosed in greater detail below.

FIG. 1 is a block diagram of an example environment 100 for monitoring watermarked media signals in accordance with the teachings of this disclosure. The example environment 100 includes an example media signal 102, an example media broadcaster 104, an example watermark encoder 106, an example watermarked media signal 108, an example media transmitter 110, an example broadcast media signal 112, an example watermark outage monitor 114, an example watermark outage alert 116, an example broadcaster control center 118, and an example audience measurement entity 120.

The example media signal 102 of the illustrated example of FIG. 1 is a signal conveying media that is intended for broadcast to an audience. The media signal 102 is received by the media broadcaster 102. The media signal 102 can be an audio signal conveying media (e.g., a radio broadcast, a podcast, etc.), an audiovisual signal conveying media (e.g., a television show, a movie, a commercial, etc.), or any other signal conveying media. In some examples, the media signal 102 is transmitted to the media broadcaster 104 by a content creator, a content distributor, or another entity. Additionally or alternatively, the media broadcaster 104 may generate the media signal itself. The media signal 102 can be conveyed wirelessly (e.g., via a network, etc.) or via a direct physical connection (e.g., cable, etc.).

The example media broadcaster 104 of the illustrated example of FIG. 1 is an entity for transmitting media signals to a broad audience. For example, the media broadcaster 104 can receive a plurality of different media signals conveying media and utilize transmission technology (e.g., via antennas, via satellites, via cable, via the internet, etc.) to make the media signals available to a large audience.

The example watermark encoder 106 of the illustrated example of FIG. 1 encodes (e.g., embeds, inputs, etc.) watermarks into the media signal 102 for subsequent identification of media conveyed by the media signal 102. In some examples, the watermark encoder 106 embeds the watermarks in audio and/or video signal characteristics into the media signal 102 such that the watermarks are sufficiently hidden (e.g., inaudible, invisible, etc.) to the audience, but still detectable and identifiable by the audience measurement entity 120. In some examples, the watermarks include information such as a program identifier, a station identifier, a timestamp, and/or any other information that can be useful in identifying the media conveyed in the media signal 102. In some examples, the watermark encoder 106 can selectively encode media signals based on whether identification information is available for the media signals. For example, a radio broadcast may have watermarks encoded throughout a radio program being broadcast, but the commercial breaks in between the radio program may not have watermarks. Therefore, some portions of the media signal 102 may be intentionally transmitted without watermarks encoded into the media signal 102. While some media signals or portions of media signals may be intentionally transmitted without watermarks encoded into the signals, others may be unintentionally transmitted without watermarks in the media signals. For example, the watermark encoder 106 can encounter issues while encoding watermarks that result in erroneous (e.g., ineffective) watermarks being encoded into the signals, or no watermarks being encoded into the signals at all. In some examples, the example broadcaster control center 118 can control the watermark encoder 106 and take actions to initiate watermark encoding, terminate watermark encoding, correct watermark encoding issues, or otherwise interact with the watermark encoding process.

The example watermarked media signal 108 of the illustrated example of FIG. 1 is the media signal output by the watermark encoder 106. The watermarked media signal 108 is similar to the media signal 102, but also includes audio and/or video characteristics that have been modified to represent an identifying watermark. In some examples, the media signal 102 and the watermarked media signal 108 may be perceived by an audience as being substantially identical, due to the encoding of the watermarks in the watermarked media signal 108 in a manner that makes the watermarks imperceptible to human senses. In some examples, portions of the watermarked media signal 108 can be intentionally or unintentionally not encoded with watermarks.

The example media transmitter 110 transmits the watermarked media signal 108 to an audience. The watermarked media signal 108, after having been processed and transmitted by the media transmitter 110, can be referred to as the broadcast media signal 112. The example media transmitter 110 can be any transmission technology for media signal transmission. For example, the media transmitter 110 can be one or more antennas, one or more satellites, one or more network-based transmission systems, or one or more cable systems, etc.

The example broadcast media signal 112 of the illustrated example of FIG. 1 is the watermarked media signal 108 following transmission by the media transmitter 110. The broadcast media signal 112 can be received by an audience (e.g., via an antenna, via a satellite dish, via a cable configuration, via a network, etc.).

The example watermark outage monitor 114 of the illustrated example of FIG. 1 monitors the watermarked media signal 108 output by the watermark encoder 106 to determine if the watermarked media signal 108 contains watermarks. The watermark outage monitor 114 is structured to generate watermark encoding outage alerts when the watermarked media signal 108 does not include encoded watermarks and the watermark outage monitor 114 determines that such a watermark outage is unintentional. For example, the watermark outage monitor 114 can determine whether an encoding outage appears to be intentional (e.g., due to a commercial break, due to a transition between programming, etc.) or unintentional (e.g., due to an error in the encoding process, due to a failure of the watermark encoder 106, etc.). To make this determination, the watermark outage monitor 114 of the illustrated example generates and utilizes models based on the presence of watermarks in observed media signals. In some examples, the models include information on onset times of watermark outages, durations of watermark outages, and/or other factors that can be useful in analyzing patterns of watermark outages.

In some examples, the watermark outage monitor 114 continually monitors the watermarked media signal 108 as it is encoded by the watermarked encoder 106. In some examples, the watermark outage monitor 114 monitors the broadcast media signal 112 in addition to, or alternatively to, the watermarked media signal 108. The example watermark outage monitor 114 outputs watermark outage alerts 116, which can be transmitted to the broadcast control center 118, to alert the media broadcaster 104 of an issue with the watermark encoder 106. The watermark outage monitor 114 can additionally or alternatively output the watermark outage alert 116 to the audience measurement entity 120. In some examples, the watermark outage monitor 114 can transmit other information about watermark outages, such as any expected watermark outages (e.g., that did not trigger alarms) to the audience measurement entity 120 and/or to the broadcaster control center 118 for further analysis.

The example watermark outage alert 116 of the illustrated example of FIG. 1 is an indicator of a watermark outage that is not expected by the model(s) of the watermark outage monitor 114. The example watermark outage alert 116 can be any form of alert (e.g., an alarm, an action trigger, an email, a text message etc.) to indicate to the media broadcaster 104 and/or to the audience measurement entity 120 that the watermark encoder 106 may not be working correctly. In some examples, the watermark outage alert 116 can additionally or alternatively be a signal or command to reset the watermark encoder 106 or otherwise reset the operation of the watermark encoder 106 to a known operating state. In some examples, the watermark outage alert 116 may indicate an onset time (e.g., a start time or an elapsed duration since a previous watermark outage) of the unexpected watermark outage and/or a duration of the unexpected watermark outage. The watermark outage alert 116 can also include supplementary information, such as whether there was silence or prior encoding observed in the media signal, or any other information that can be useful in diagnosing the issue causing the watermark outage.

The example broadcaster control center 118 of the illustrated example of FIG. 1 is an element of the media broadcaster 104 that has control over the watermark encoder 106. The broadcast control center 118 receives the watermark outage alert 116 to analyze the watermark outage and take corrective action when necessary. For example, the broadcaster control center 118 can, in response to receiving the watermark outage alert 116, troubleshoot the watermark encoder 106.

The example audience measurement entity 120 is an entity for measurement and monitoring of audiences associated with media programming and/or advertisements (e.g., the Nielsen Company (US), LLC). The audience measurement entity 120 can utilize watermarks to identify media and perform various tasks, such as audience size calculations, demographics calculations, etc. The audience measurement entity 120 therefore desires, and may rely upon, reliable watermark encoding. When the audience measurement entity 120 receives a watermark outage alert 116, the audience measurement entity 120 can take corrective action to correct any data based on the media signals lacking watermarks, and/or to work with the media broadcaster 104 to address the problem. The audience measurement entity 120 may also receive additional information from the watermark outage monitor 114 to ensure the monitoring process is working correctly and access models associated with expected watermark outages (e.g., to ensure commercials are being inserted at appropriate times and with appropriate durations). In some examples, the watermark outage monitor 114 can be implemented partially or entirely at the audience measurement entity 120.

In operation, the media signal 102 is received by the watermark encoder 106. The watermark encoder 106 then encodes watermarks into the media signal 102 and outputs the watermarked media signal 108, which is received by the media transmitter 110 and transmitted as the broadcast media signal 112. The watermarked media signal 108 is additionally received by the watermark outage monitor 114 to ensure the watermarked media signal 108 includes watermarks. In the event that the watermark outage monitor 114 detects an unexpected watermark outage (e.g., due to an error with the watermark encoder 106, etc.), the watermark outage monitor 114 issues the watermark outage alert 116. The watermark outage alert 116 is received by the broadcast control center 118 and is additionally received by the audience measurement entity 120.

Figure 2:
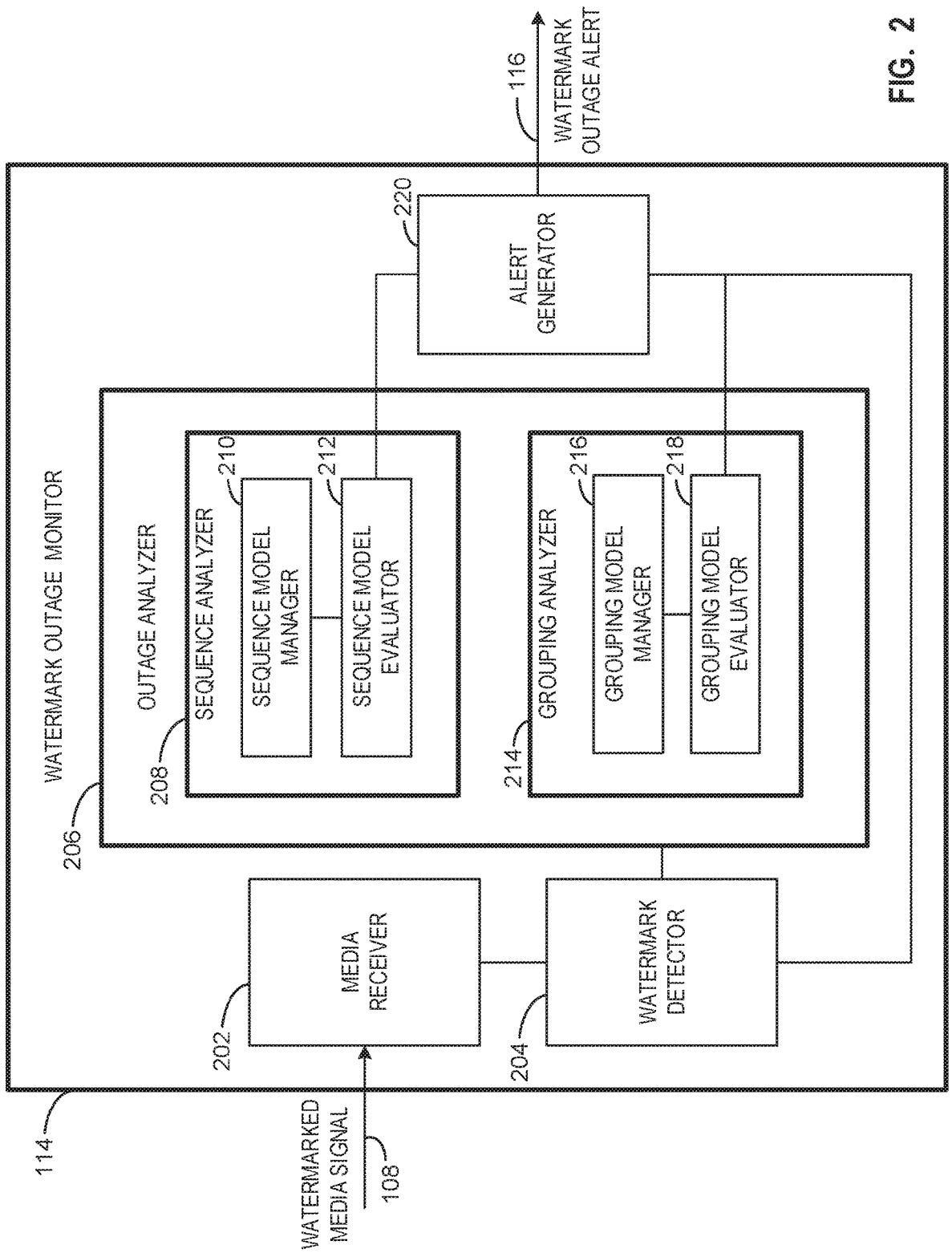
FIG. 2 is a block diagram of an example watermark outage monitor to detect watermark outages in accordance with the teachings of this disclosure.

FIG. 2 is a block diagram of an example implementation of the watermark outage monitor 114 for detecting watermark outages constructed in accordance with the teachings of this disclosure. The watermark outage monitor 114 includes an example media receiver 202, an example watermark detector 204, an example outage analyzer 206, an example sequence analyzer 208, an example sequence model manager 210, an example sequence model evaluator 212, an example grouping analyzer 214, an example grouping model manager 216, an example grouping model evaluator 218, and an example alert generator 220.

The example media receiver 202 of the illustrated example of FIG. 2 receives the watermarked media signal 108 and any other media signals for monitoring. The media receiver 202 is in communication with the watermark encoder 106 and, thus, can have a physical connection with an output of the watermark encoder 106 of the media broadcaster 104 of FIG. 1, a wireless connection, or any other connectivity to receive the watermarked media signal 108 and/or the broadcast media signal 112.

The example watermark detector 204 of the illustrated example of FIG. 2 determines whether the watermarked media signal 108 includes watermarks. In some examples, the watermark detector 204 continually monitors media signals received by the media receiver 202 to determine whether watermarks are present in the media signals. In some examples, the watermark detector 204 can be implemented as a watermark decoder, capable of identifying watermarks and determining the information included in the watermarks (e.g., program identification information, station identification information, timestamps, etc.). The watermark detector 204 provides indications of watermark outages to the outage analyzer 206, which can use the watermark outage data to generate watermark outage models, update watermark outage models, and/or compare a detected watermark outage to the watermark outage models. In some examples, the watermark detector 204 provides watermark outage data (e.g., indications of detected watermarks) to the alert generator 224, which can, in response to receiving a detected watermark outage, access information from the outage analyzer 206 to determine whether to generate a watermark encoding outage alert 116.

The watermark detector 204 can provide watermark outage data in any format. For example, the watermark detector 204 can represent the state of watermark encoding in the watermarked media signal 108 as a series of binary values sampled at a specified rate (e.g., one sample per second, one sample per minute, etc.). The watermark detector 204 can therefore generate an alarm sequence that can be analyzed by the outage analyzer 206 to determine onset times associated with watermark outages and durations associated with watermark outages. If an alarm sequence is generated with a zero value representing watermark encoding being present (e.g., no watermark outage) and a one value representing a watermark outage, an example alarm sequence might be: 00011000111100. If the start of this sequence represents a start time of zero seconds, and the sample rate is one second, this alarm sequence indicates that a first watermark outage occurred at four seconds, which had a duration of two seconds, and a second watermark outage occurred at nine seconds, which had a duration of four seconds.

The example outage analyzer 206 of the illustrated example of FIG. 2 analyzes watermark outage data to generate models for watermark outages, update models for watermark outages, and evaluate models for watermark outages. In some examples, the outage analyzer 206 is capable of generating and updating models directed to onset times of watermark outages and/or generating and updating models directed to durations of watermark outages. The outage analyzer 206 generates and updates models based on the watermark outages detected by the watermark detector 204 and evaluates detected watermark outages with respect to the model(s) to enable the alert generator 224 to generate alarms when an outlier watermark outage occurs. In some examples, the outage analyzer 206 evaluates an onset time and/or a duration of a detected watermark outage to determine whether the detected watermark outage corresponds to an expected watermark outage represented in the model(s). In some examples, the outage analyzer 206 maintains a sliding time window that defines a time period for which watermark outage data is utilized in the sequence model and/or the grouping model. For example, the outage analyzer 206 can be configured to consider watermark outage data as part of the model for a configured time period (e.g., for a month, for a year, etc.). When data is older than this specified time period and is no longer in the sliding time window, the outage analyzer 206 can update the sequence model and/or the grouping models accordingly, to no longer represent this data in the model(s). In some examples, only outlier data is removed from the model(s) after it is outside the sliding time window.

The example sequence analyzer 208 of the illustrated example of FIG. 2 generates, updates and evaluates an outage sequence model based on onset times (e.g., start times or elapsed times since previous watermark outages) associated with detected watermark outages. In some examples, the sequence analyzer 208 utilizes a Markov model (e.g., by generating a discrete Markov chain) having states representing onset times associated with observed watermark outages. The sequence analyzer 208 can continually update the sequence model to represent data within the sliding time window maintained by the outage analyzer 208. The sequence analyzer 208 can analyze a detected watermark outage from the watermark detector 204 to evaluate the watermark outage against the sequence model and determine whether the watermark outage corresponds to an expected (e.g., intentional) watermark outage. For example, if a watermark outage typically occurs twenty-five minutes past the hour, as determined from prior watermark outages represented as states in the sequence model, the sequence analyzer 208 can determine that a new detected watermark outage occurring at twenty-five minutes past the hour is an expected watermark outage because the detected watermark outage corresponds to a state in the model. The example sequence analyzer 208 may additionally or alternatively consider a previous watermark outage onset time as well when analyzing a detected watermark outage, to determine whether a transition associated with the detected watermark outage is expected (e.g., the previous watermark outage onset time and the new detected watermark outage onset time correspond to two states in the model connected by a transition in the model). In examples where the sequence analyzer 208 utilizes a Markov model, the model stores transition probabilities, in addition to storing repeated sequences for confidence metrics. In some examples, variations in the pattern for onset times may result in evaluating the duration of the outage as the outage progresses to determine whether or not to raise the alarm.

In some examples involving missing information (e.g., missing historical watermark outage data) due to communication failures, a temporary change in programming that impacts the occurrence of alarms, a higher order (sequence-dependent) probability dependency to the observed outages, etc., hidden node analysis is performed to determine if an observed elapsed time is 1) a combination of other elapsed times as part of a Markov cycle (within cluster resolution), or 2) a sequence dependency to the probability distribution (to account for higher order Markov behavior). An example hidden node analysis based on a combination of other elapsed times as part of a Markov cycle is described in association with FIGS. 7A-7B.

The example sequence model manager 210 of the illustrated example of FIG. 2 generates and updates the sequence model. In some examples, the sequence model manager 210 can generate the model based on an initial watermark outage dataset that has been previously collected. In some examples, such an initial watermark outage dataset may be a learning dataset intended to represent typical watermark outage data from a similar broadcast and/or broadcaster. In some examples, the sequence model manager 210 continually updates the model based on the watermark outages detected by the watermark detector 204. In some examples, the sequence model manager 210 updates the model at regular intervals (e.g., after a specified time period, after a specified number of watermark outages, etc.) or in response to an update request (e.g., by the broadcaster control center 118 of FIG. 1, by the audience measurement entity 120 of FIG. 1, etc.). The sequence model manager 210 may also be configured by the client to suppress alarms based on specific criteria, such as, but not limited to, based on elapsed time only, duration only, a combination of elapsed time and duration, or a confidence metric based on 1) the percentage of noise (considered as outliers) in the training data, 2) the presence of specific properties such as silence or prior encoding, or 3) the match along a prior observed sequence, etc.

To generate the sequence model, the sequence model manager 210 generates states associated with elapsed times for observed watermark outages and generates state transitions in the model. When a new state is initially observed (e.g., a watermark outage has an onset time that has not been previously observed), a state corresponding to this new onset time is initially recognized as an outlier state. In some examples, an occurrence threshold can be utilized to determine if an outlier state can be elevated to an expected outage state (e.g., a state associated with an expected watermark outage onset time, such as a time typically associated with a commercial break, etc.) in response to a state being observed numerous times. In addition to states, state transitions (e.g., a transition from a first watermark outage with a first onset time to a second watermark outage with a second onset time) are represented in the model. When a detected watermark outage is being added to the model, the sequence model manager 210 can additionally access data pertaining to the previous watermark outage to analyze the state transition that has occurred. If the sequence model manager 210 identifies a state transition in the model that corresponds to the state transition of the detected watermark outage currently being added to the model, then the probabilities associated with the existing state transition are updated based on the newly added watermark outage. If the sequence model manager 210 does not identify a state transition corresponding to the state transition of the detected watermark outage currently being added to the model, then a new state transition is added. Given the probability of occurrence of the new state transition is low, it will be treated as an outlier. If the same transition occurs several more times and satisfies an occurrence threshold, the sequence model manager 210 can elevate the state transition to an expected outage state transition. In some examples, an outlier state transition is elevated to be an expected outage state transition in response to a probability associated with the threshold satisfying a configurable occurrence probability threshold. An example state and state transition diagram associated with a sequence model is depicted in FIG. 5F. In some examples, the sequence model manager 210 can additionally or alternatively generate states and assign watermark outages to states based on other factors associated with watermark outages. For example, states could include a property accounting for whether the outage occurred during day-time programming or night-time programming, to add confidence to the determination the outage is due to low power transmission.

In some examples, to avoid excessive and inaccurate outliers, a clustering algorithm is additionally implemented by the sequence model manager 210 that determines separations between values (elapsed times or durations) based on the creation of seed clusters from nearest neighbor considerations or k-means clustering.

In some examples, the sequence model manager 210 continually updates probabilities of states and/or state transitions and the statuses of states and/or state transitions (e.g., as outlier or expected) based on the data included in the sliding time window. In this manner, the sequence model manager 210 updates the model to represent more recent data as opposed to older data. In this manner, outlier states and/or outlier state transitions are removed from the model after a specified period, once occurrences of these outlier states and/or outlier state transitions are outside of the sliding time window.

The example sequence model evaluator 212 of the illustrated example of FIG. 2 evaluates detected watermark outages from the watermark detector 204 against the sequence model. In some examples, the sequence model evaluator 212 evaluates the detected watermark outage against the latest updated model maintained by the sequence model manager 210. The same watermark outage may be subsequently accounted for in the sequence model when the sequence model manager 210 updates the model. In some examples, updating the model occurs simultaneously to evaluating the detected watermark outage against the sequence model. To evaluate the detected watermark outage against the sequence model, the sequence model evaluator 212 determines an onset time for the detected watermark outage and accesses an onset time for the previous detected watermark outage. In some examples where the onset time is an elapsed time since the previous watermark outage, the sequence model evaluator 212 determines an onset time for the detected watermark (e.g., without necessarily accessing an onset time for the previous watermark outage). The sequence model evaluator 212 then determines whether the onset time associated with the detected watermark outage corresponds to an expected outage state in the sequence model. The sequence model evaluator 212 additionally or alternatively determines whether the state transition between the previous state and the new state is associated with an expected outage state transition in the sequence model. In some examples, the sequence model evaluator 212 provides a determination to the alert generator 220 as to whether the detected watermark outage is associated with an expected outage state and an expected outage state transition in the sequence model. In some examples, the sequence model evaluator 212 can determine if the state transition is associated with an expected transition, without separately determining if the current state is an expected outage state, since an expected outage state transition occurs between expected outage states. In such examples, the sequence model evaluator 212 can indicate to the alert generator 220 whether the state transition was an expected outage state transition, without indicating whether the specific state of the detected watermark outage was expected.

The example grouping analyzer 214 generates, updates and evaluates grouping models based on durations associated with watermark outages. In some examples, the grouping analyzer 214 utilizes clustering techniques (e.g., k-means clustering, nearest neighbor seed-based clustering, etc.) to identify common durations and/or onset times for watermark outages. For example, commercial breaks are typically known to have relatively common durations (e.g., thirty seconds, two minutes, etc.) and to occur at relatively common intervals (e.g., every eight minutes, every ten minutes, etc.). Hence, watermark outages having similar durations and onset times (e.g., falling within the same cluster) are likely associated with an expected watermark outage. The grouping analyzer 214 can determine whether a detected watermark outage corresponds to an existing cluster and/or whether a detected watermark outage exceeds a duration alarm threshold and provide such information to the alert generator 220. In the illustrated example, the alert generator 220 issues a watermark outage alert if the detected watermark outage has a duration not corresponding to an existing cluster.

The example grouping model manager 216 of the illustrated example of FIG. 2 generates and updates a grouping model based on detected watermark outages. The example grouping model manager 216 can generate and/or update the grouping model in tandem with the sequence model manager 210 generating and/or updating the sequence model. In some examples, the grouping model manager is generated based on an initial learning data set including watermark outages representative of typical outages for a specific broadcaster. In some examples, the grouping model manager 216 can continually build and update the model as new watermark outages are detected by the watermark detector 204. In some examples, the grouping model manager 216 updates the grouping model at regular intervals (e.g., after a specified time period, after a specified number of watermark outages, etc.) or in response to an update request (e.g., by the broadcaster control center 118 of FIG. 1., by the audience measurement entity 120 of FIG. 1, etc.).

To generate the grouping model, the grouping model manager 216 creates clusters for watermark outages that have durations and/or onset times, or combinations of durations and onset times that are not represented by current clusters (e.g., a first duration that has been previously observed but at a different onset time than the first duration has typically been observed at, etc.) in the model. When a new watermark outage is selected for addition to the model, the grouping model manager 216 determines whether the duration associated with the selected watermark outage corresponds to an existing cluster. In response to the grouping model manager 216 determining that the duration does correspond to an existing cluster, the selected watermark outage can be associated with the cluster. Conversely, in response to the grouping model manager 216 determining that the selected watermark outage does not correspond to an existing cluster, a new outlier cluster can be created.

During an initial phase of the grouping model, when insufficient data exists to form reliable clusters, the grouping model manager 216 can be configured with an initial duration alarm threshold that is stored in the model and represents a maximum duration of an expected watermark outage. This initial duration alarm threshold can then be updated as the model is further developed and more watermark outage durations are incorporated into the grouping model. For example, the duration alarm threshold can be continually updated to be a percentage or an amount higher than the duration of the cluster with the longest duration. In some examples, when the grouping model manager 216 has developed a sufficiently deep model (e.g., including numerous different clusters representative of a long observation period or at least one entire sliding time window), the duration alarm threshold can be eliminated, and the clusters themselves can be utilized to determine if a watermark outage duration is expected. In such examples, if a duration of a watermark outage does not correspond to one of the existing clusters, it can be determined to be an outlier, and the indication can be transmitted to the alert generator 220 for a potential watermark outage alert. Over time, if the grouping model manager 216 encounters an additional number of watermark outages with durations that correspond to the outlier duration, the grouping model manager 216 can determine that this cluster satisfies an occurrence threshold sufficient to become a new expected cluster, representing an expected duration of watermark outages.

In some examples, the grouping model manager 216 can work in cooperation with the sequence model manager 210 to determine clusters associated with states of the sequence model. In some examples, the grouping model and the sequence model are aspects of a single model, with duration serving as an additional means of characterizing a state in a Markov model. In some examples, the grouping model manager 216 can generate duration alarm thresholds specific to states associated with the sequence model. For example, if a specific state of the sequence model is also associated with watermark outages having duration values that are similar, a duration alarm threshold can be determined for this specific state. In such examples, the grouping model can accurately identify an unexpected watermark outage that may occur if a duration exceeds the typical duration at this state (e.g., a watermark outage does not end at the end of a commercial break due to an encoding problem, etc.).

Figure 6A:
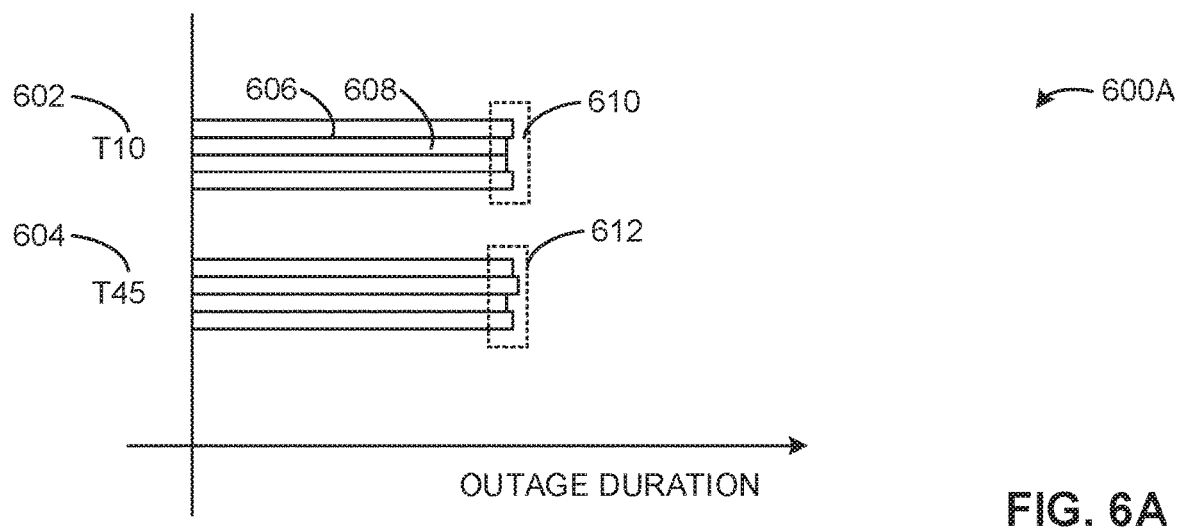
FIG. 6A is an example outage duration plot including watermark outages having two example outage onset times that can be represented by two outage clusters.
Figure 6B:
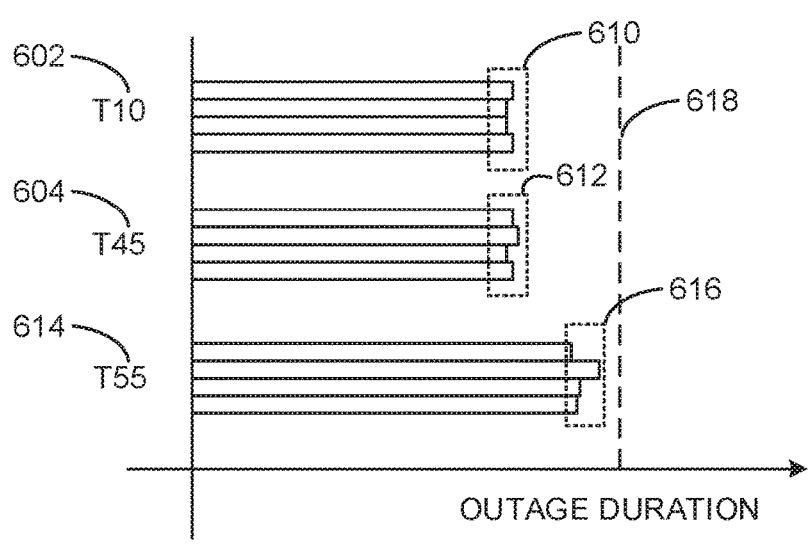
FIG. 6B is an example outage duration plot including watermark outages having three example outage onset times that are represented by three outage clusters.
Figure 6C:
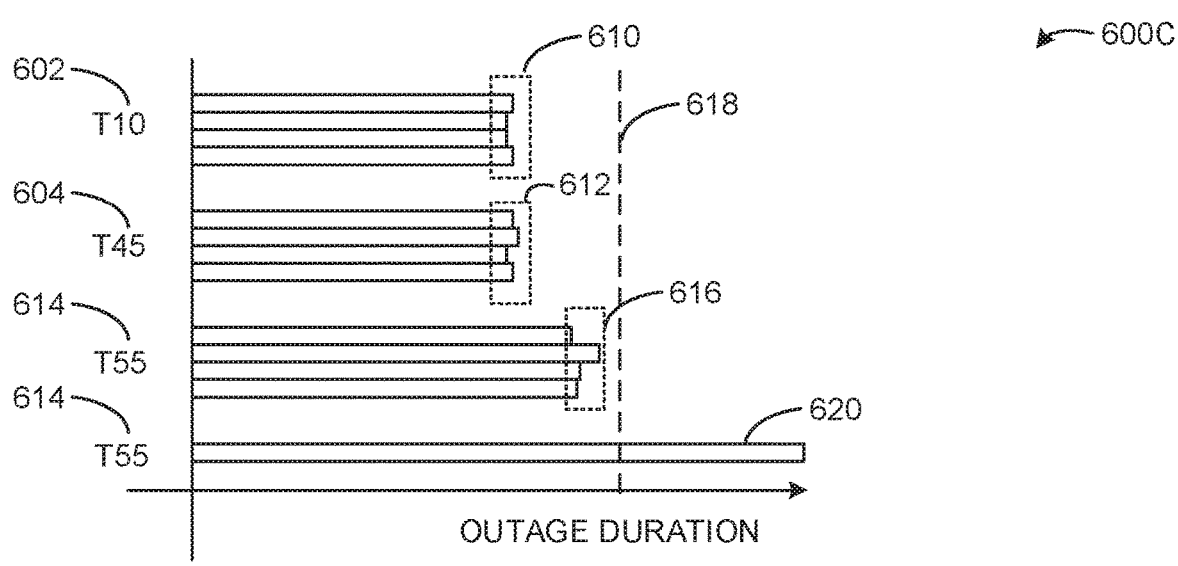
FIG. 6C is an example outage duration plot depicting an outlier watermark outage exceeding an example duration alarm threshold.
Figure 7A:
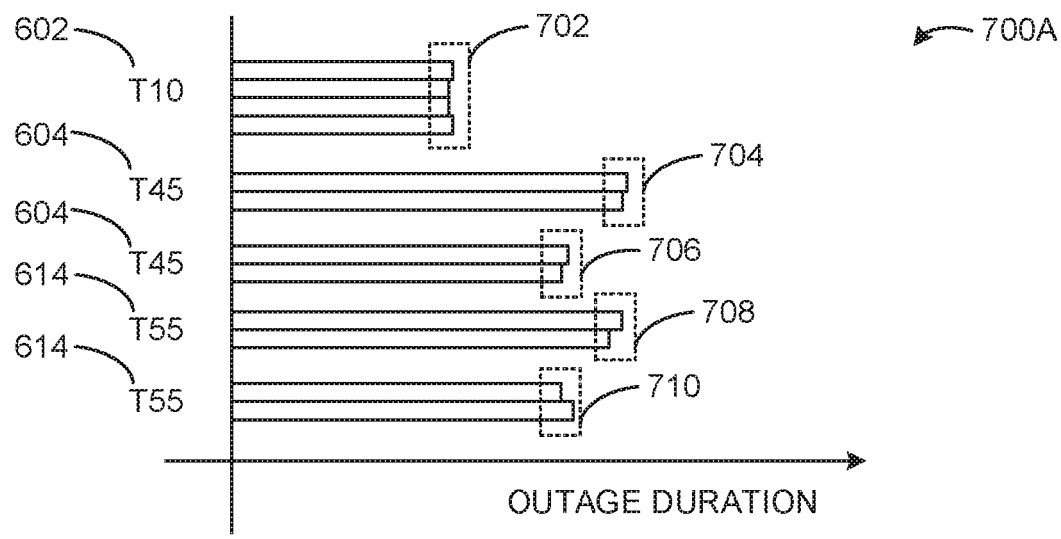
FIG. 7A is an example outage duration plot including watermark outages with same onset times represented by more than one cluster.
Figure 7B:
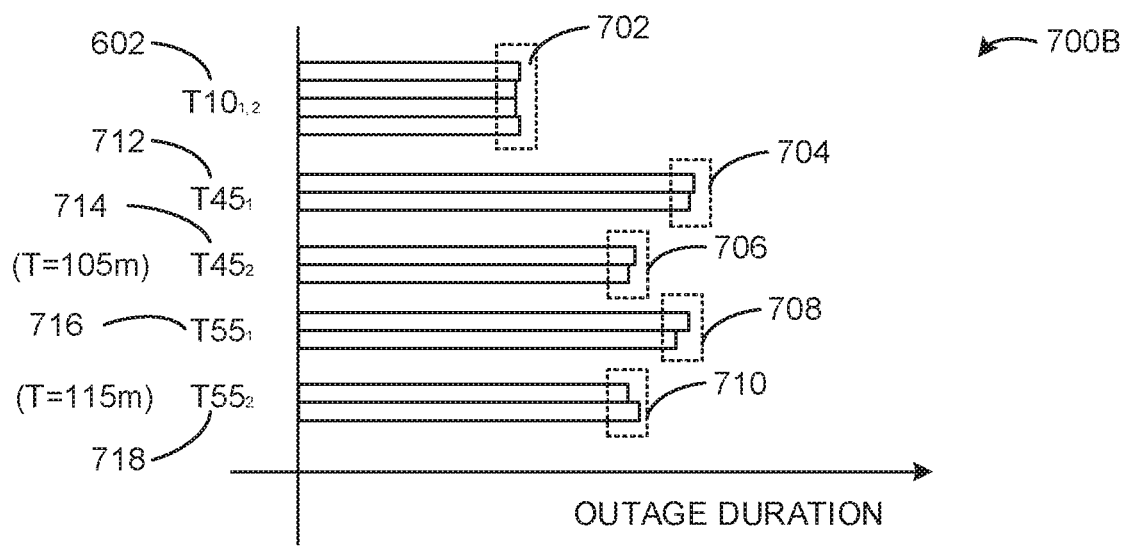
FIG. 7B is an example outage duration plot representing the outage data of FIG. 7A reorganized in an adjusted model.

The grouping model manager 216 can also reorganize clusters in association with different states of the sequence model to search for an alternative model that more accurately represents underlying patterns in the data. For example, if the sequence model is based on an hourly system (e.g., at the end of each hour the onset time resets to "zero" in the model, if the onset time is a discrete onset time) but the durations of commercial breaks vary every other hour, there may be multiple clusters associated with each state (e.g., with each onset time). In such examples, the grouping model manager 216 can search for additional states that better represent the data. In some examples, these states may represent hidden states (e.g., as in a Hidden Markov Model), that account for underlying factors contributing to the existence of different states. Example grouping models that can be generated by the grouping model manager 216 are depicted in FIGS. 6A-6C. An example reorganization process that can be undertaken by the grouping model manager 216 and the sequence model manager 210 is depicted in FIGS. 7A-7B.

The grouping model evaluator 218 of the illustrated example of FIG. 2 evaluates detected watermark outages from the watermark detector 204 against the grouping model. In some examples, the grouping model analyzer 218 evaluates the detected watermark outage against the latest updated model maintained by the grouping model manager 216. The same watermark outage may be subsequently accounted for in the grouping model when the grouping model manager 216 updates the grouping model. In some examples, updating the model occurs simultaneously to evaluating the detected watermark against the grouping model. To evaluate the detected watermark outage against the grouping model, the grouping model evaluator 218 determines a duration and an onset time (e.g., an elapsed time since a prior watermark outage) for the detected watermark outage. The grouping model evaluator 218 then determines if the duration associated with the detected watermark outage and the onset time associated with the detected watermark outage are within a threshold of an existing cluster in the grouping model. If the duration of the detected watermark outage and the onset time of the detected watermark outage do fall within an existing cluster of the grouping model, then the grouping model evaluator 218 provides a determination to the alert generator 220 that the detected watermark outage has an expected duration. Conversely, if the duration of the detected watermark outage and the onset time of the detected watermark outage do not fall within an existing cluster of the grouping model, the grouping model evaluator 218 provides a determination to the alert generator 220 that the detected watermark outage does not correspond to an expected cluster, which may result in the alert generator 220 generating a watermark outage alert. In some examples, the grouping model evaluator 218 can additionally or alternatively determine if the duration of the detected watermark outage exceeds a duration alarm threshold associated with the grouping model and/or associated with one or more clusters of the state of the detected watermark outage. In response to the duration of the detected watermark outage exceeding the duration alarm threshold, the grouping model evaluator 218 can provide a determination to the alert generator 220 to generate the watermark outage alert 116.

The alert generator 220 of the illustrated example of FIG. 2 generates the watermark outage alert 116 in response to a watermark outage detected by the watermark detector 204 and a determination from the outage analyzer 206 indicating that the watermark outage is unexpected. In some examples, the alert generator 220 generates the watermark outage alert 116 when (1) a watermark outage is detected and (2) either (a) the sequence model indicates that the detected watermark has an unexpected watermark outage onset time (e.g., an unexpected outage state and/or unexpected outage state transition) or (b) the grouping model indicates that the detected watermark has an unexpected duration, onset time or combination of duration and onset time (e.g., not corresponding to a cluster of the model) or an excessive duration (e.g., surpassing a duration alarm threshold). In some examples, the alert generator 220 can utilize any combination of these determinations to decide whether to generate the watermark encoding outage alert.

In operation, the watermarked media signal 108 is received by the media receiver 202 and is additionally processed by the watermark detector 204 to determine whether the watermarked media signal 108 includes watermarks. The outage analyzer 206 processes the watermarked media signal 108 at the sequence analyzer 208 by generating and/or updating a sequence model. The sequence model evaluator 212 can utilize the sequence model to evaluate watermark outages detected by the watermark detector 204 against the sequence model. The grouping analyzer 214 processes the watermarked media signal 108 at the grouping model manager 216 by generating and/or updating a grouping model. The grouping model evaluator 218 can utilize the grouping model to evaluate watermark outages detected by the watermark detector 204 against the grouping model. In response to the watermark detector 204 detecting a watermark outage, and the sequence model evaluator 212 and/or the grouping model evaluator 218 determining that the watermark outage is not an expected watermark outage, the alert generator 220 can generate the watermark outage alert 116.

While an example manner of implementing the watermark outage monitor 114 of FIG. 1 is illustrated in FIG. 2, one or more of the elements, processes and/or devices illustrated in FIG. 2 may be combined, divided, re-arranged, omitted, eliminated and/or implemented in any other way. Further, the example media receiver 202, the example watermark detector 204, the example outage analyzer 206, the example sequence analyzer 208, the example sequence model manager 210, the example sequence model evaluator 212, the example grouping analyzer 214, the example grouping model manager 216, the example grouping model evaluator 218, the example alert generator 220 and/or, more generally, the example watermark outage monitor 114 of FIG. 1 may be implemented by hardware, software, firmware and/or any combination of hardware, software and/or firmware. Thus, for example, any of the example media receiver 202, the example watermark detector 204, the example outage analyzer 206, the example sequence analyzer 208, the example sequence model manager 210, the example sequence model evaluator 212, the example grouping analyzer 214, the example grouping model manager 216, the example grouping model evaluator 218, the example alert generator 220 and/or, more generally, the example watermark outage monitor 114 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC (s)), programmable logic device(s) (PLD(s)) and/or field programmable logic device(s) (FPLD(s)). When reading any of the apparatus or system claims of this patent to cover a purely software and/or firmware implementation, at least one of the example media receiver 202, the example watermark detector 204, the example outage analyzer 206, the example sequence analyzer 208, the example sequence model manager 210, the example sequence model evaluator 212, the example grouping analyzer 214, the example grouping model manager 216, the example grouping model evaluator 218, the example alert generator 220 is/are hereby expressly defined to include a non-transitory computer readable storage device or storage disk such as a memory, a digital versatile disk (DVD), a compact disk (CD), a Blu-ray disk, etc. including the software and/or firmware. Further still, the example watermark outage monitor 114 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3A:
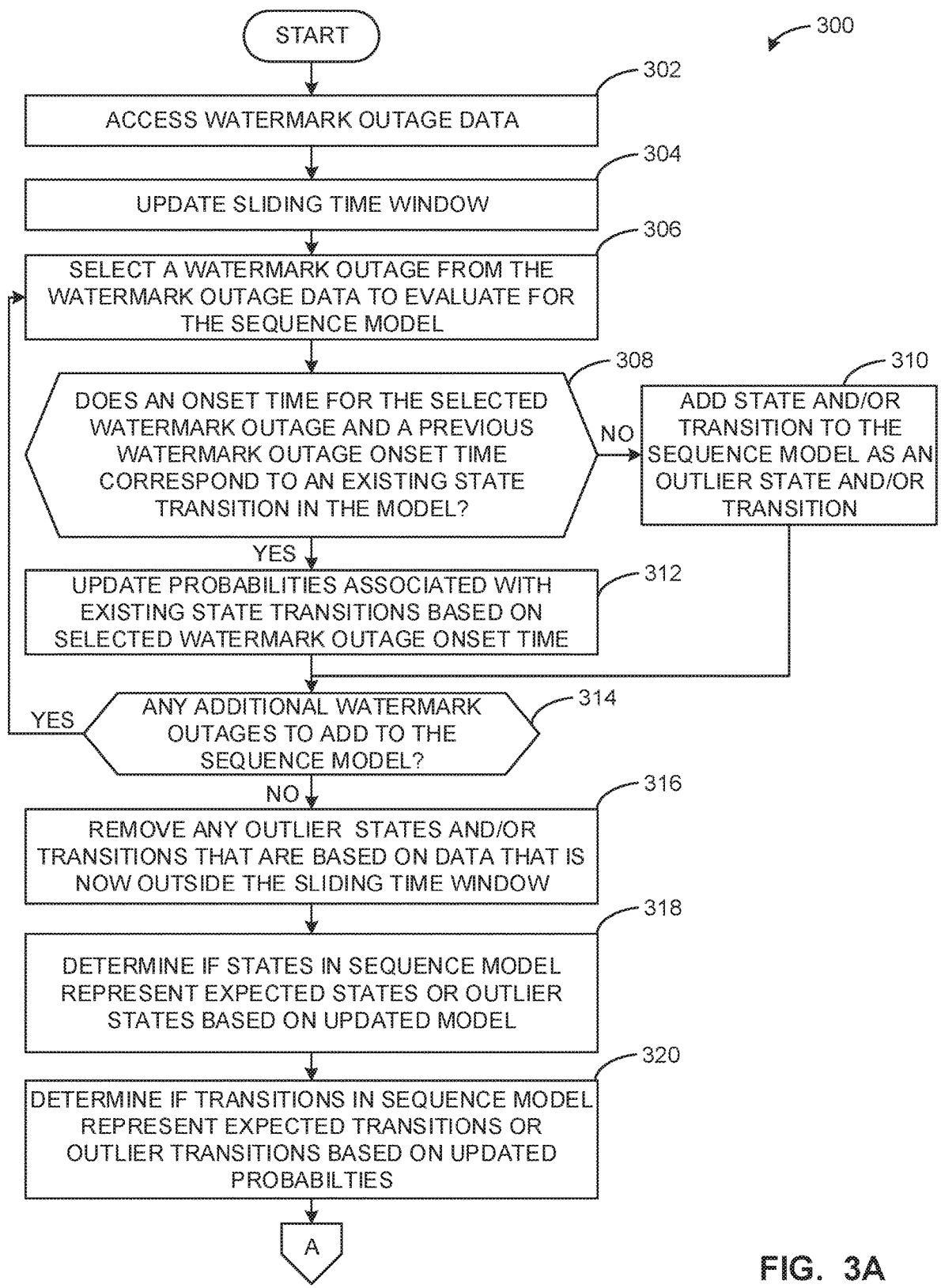
FIGS. 3A-3B are flowcharts representative of machine readable instructions that may be executed to implement the watermark outage monitor of FIGS. 1 and 2 to generate and/or update a sequence model and a grouping model.
Figure 3B:
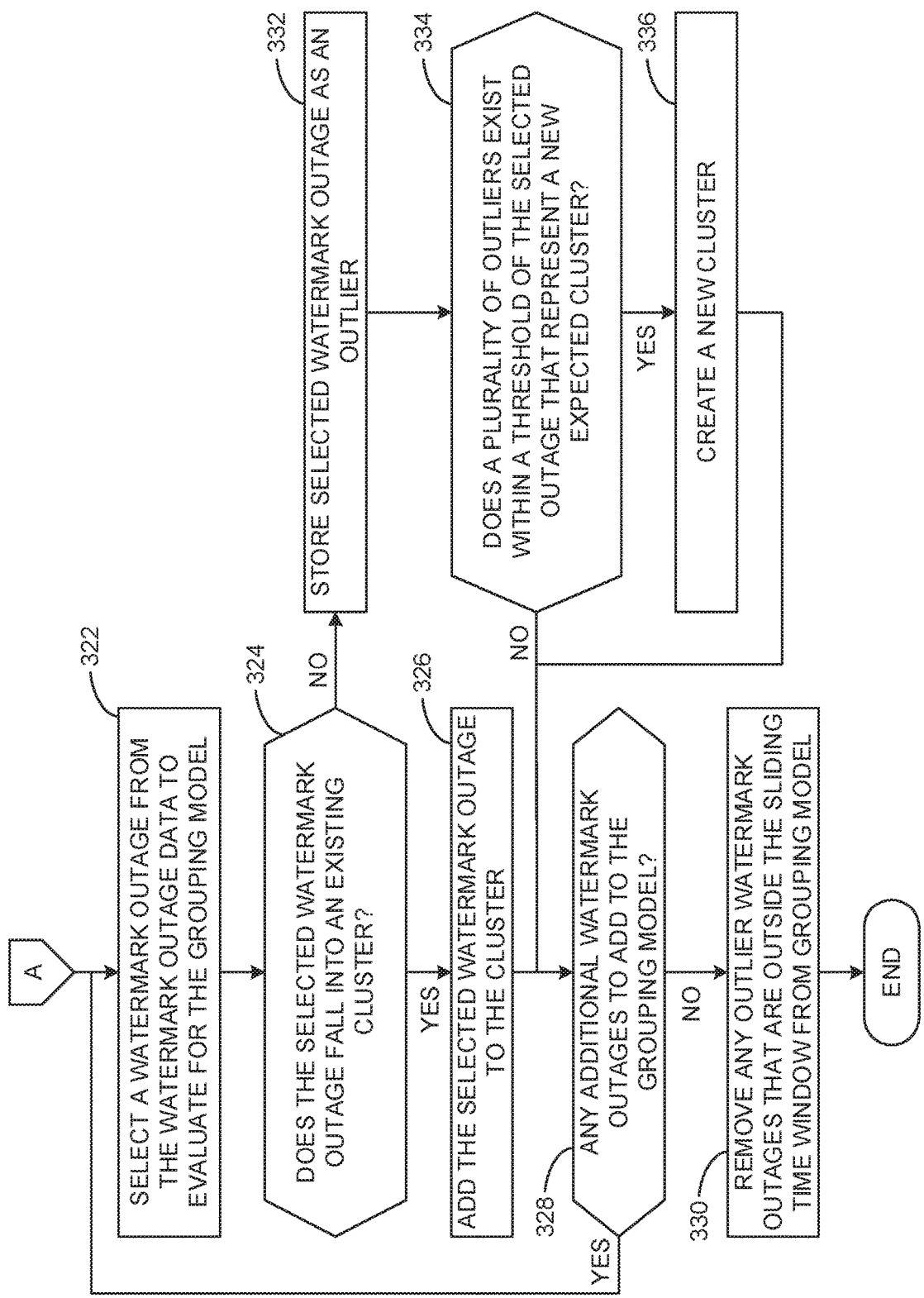
Figure 4:
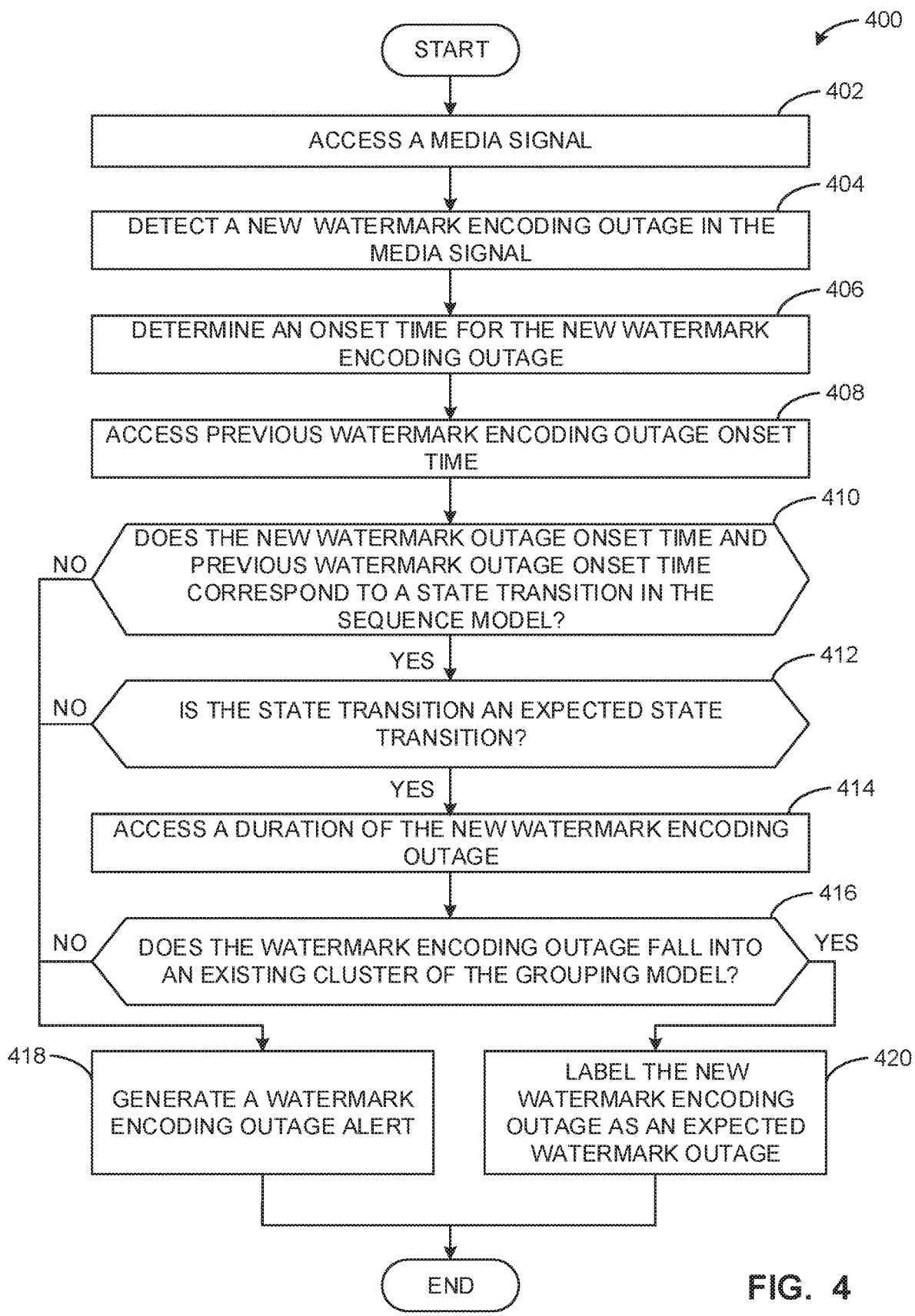
FIG. 4 is a flowchart representative of machine readable instructions which may be executed to implement the watermark outage monitor of FIGS. 1 and 2 to analyze a detected watermark encoding outage and determine if a watermark outage alert should be generated.

Flowcharts representative of example hardware logic, machine readable instructions, hardware implemented state machines, and/or any combination thereof for implementing the watermark outage monitor 114 of FIG. 2 is shown in FIGS. 3A, 3B, and 4. The machine readable instructions may be an executable program or portion of an executable program for execution by a computer processor such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowcharts illustrated in FIGS. 3A, 3B, and 4, many other methods of implementing the example watermark outage monitor 114 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 3A, 3B, and 4 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

Example machine readable instructions 300 that may be executed by the watermark outage monitor 114 to generate and/or update the sequence model and the grouping model are illustrated in FIGS. 3A-3B. With reference to the preceding figures and associated descriptions, the example machine readable instructions 300 of FIG. 3A begin with the example watermark outage monitor 114 accessing watermark outage data (block 302). In some examples, the watermark outage data accessed by the outage analyzer 206 indicates at least onset times and durations associated with watermark outages in a media signal. The watermark outage data can be in any format. For example, the watermark outage data can be a series of binary values representing whether the media signal includes watermark(s) or does not include watermark(s) during a sample period. In some examples, the watermark detector 204 can provide the watermark outage data to the outage analyzer 206.

At block 304, the example watermark outage monitor 114 updates a sliding time window. In some examples, the outage analyzer 206 updates a sliding time window by incrementing the sliding time window by a specified amount of time. For example, the sliding time window can be incremented by a number of seconds, minutes, hours, days, etc. The sliding time window represents a duration of time for which watermark outages are represented by the sequence model and/or the grouping model. For example, the sliding time window can be configured such that the sequence model and/or the grouping model are updated based on watermark outages that have occurred within the time range of the sliding time window (e.g., within the previous three days, within the previous week, within the previous month, etc.).

At block 306, the example watermark outage monitor 114 selects a watermark outage from the watermark outage data to evaluate for the sequence model. In some examples, the sequence model manager 210 selects a watermark outage from the watermark outage data to evaluate for the sequence model by selecting the watermark outages in sequential order for addition to the sequence model. The sequence model manager 210 can select watermark outages in any order when selecting watermark outages to update the sequence model.

At block 308, the example watermark outage monitor 114 determines whether an onset time for the selected watermark outage and a previous watermark outage onset time correspond to an existing state transition in the model. In some examples, the sequence model manager 210 accesses a previous watermark outage from the watermark outage data and determines whether an onset time associated with the previous watermark outage and an onset time associated with the selected watermark outage correspond to an existing state transition. For example, if the selected watermark outage has an onset time at five minutes, and the previous watermark outage has an onset time at two minutes, the sequence model manager 210 determines whether there is a state transition in the sequence model that connects the states corresponding to these onset times. In some examples, the watermark outage monitor 114 determines directly based on the onset time for the selected watermark outage whether the outage corresponds to an existing state transition in the model, if the onset time is an elapsed time since a previous watermark outage. In response to determining that the onset time for the selected watermark outage corresponds to an existing state transition in the sequence model, processing transfers to block 312. Conversely, in response to the onset time for the selected watermark outage not corresponding to an existing state transition in the sequence model, processing transfers to block 310.

At block 310, the example watermark outage monitor 114 adds a state and/or state transition to the sequence model as an outlier state and/or state transition. In some examples, the sequence model manager 210 adds a state and/or state transition to the sequence model as an outlier state and/or state transition. For example, if the selected watermark outage has an onset time that does not correspond to an existing state in the sequence model, the sequence model manager 210 creates a new state associated with the onset time of the selected watermark outage. Additionally or alternatively, if the selected watermark outage and the previous watermark outage do not correspond to an existing state transition in the sequence model, the sequence model manager 210 creates a new state transition between states of the sequence model. When a new state and/or new state transition is added to the sequence model, they are initially labeled as outlier states and/or outlier state transitions, as they have only been witnessed once within the sliding time window. In some examples, state transitions are not labeled as outlier state transitions or expected outage state transitions, but rather are evaluated based on a probability associated with the state transition when evaluating a detected watermark outage against the sequence model.

At block 312, the example watermark outage monitor 114 updates probabilities associated with existing state transitions based on the selected watermark outage onset time. In some examples, the sequence model manager 210 updates probabilities associated with the existing state transitions based on the selected watermark outage onset time, such as by increasing a probability associated with the state transition corresponding to the selected watermark outage due to its occurrence. The introduction of the selected watermark outage into the sequence model, in combination with the sliding window, can increase or decrease probabilities associated with any of the state transitions in the model.

At block 314, the example watermark outage monitor 114 determines whether there are any additional watermark outages to add to the sequence model. In some examples, the outage analyzer 206 can determine whether there are any additional watermark outages to add to the sequence model by determining whether all the watermark outages represented in the watermark outage data have been incorporated into the sequence model (e.g., added to the model by updating counts and probabilities associated with states and state transitions corresponding to the watermark outages, added to the model by creating a new outlier state and/or outlier transition, etc.). In response to determining that there are additional watermark outages to be added to the sequence model, processing transfers to block 306 to select a new watermark outage. Conversely, in response to there being no additional watermark outages to be added to the sequence model, processing transfers to block 316.

At block 316, the example watermark outage monitor 114 removes any outlier states and/or outlier state transitions that are based on data that is now outside the sliding time window. In some examples, the sequence model manager 210 removes any outlier states and/or outlier state transitions that are based on data that is now outside the sliding time window. For example, if the sequence model includes an outlier state that occurred twenty-one days ago, and the sliding time window only includes watermark outage data that is from the previous twenty days, the sequence model manager 210 can remove the outlier state. In some examples, the sequence model manager 210 removes only outlier states and/or outlier state transitions that have fallen outside of the sliding time window. In other examples, the sequence model manager can additionally or alternatively remove non-outlier data from the model once it is outside of the sliding time window. In some examples, the outlier states and/or outlier state transitions are not entirely deleted, such as if the outlier state still represents some data that is within the sliding time window. For example, if an outlier state was observed twenty-one days ago, and again five days ago (e.g., two times in total), and the sliding time window is set to include data from the last twenty days, the outlier state would still exist, but with only one associated watermark outage, as opposed to two.

At block 318, the example watermark outage monitor 114 determines if states in the sequence model represent expected outage states or outlier states based on the updated model. In some examples, the sequence model manager 210 updates the status (e.g., expected status or outlier status) based on the updated model, due to potential changes that may have occurred when the model was updated to account for new watermark outages observed. For example, if sufficient watermark outages are observed with a particular onset time to make an outlier state associated with the particular onset time satisfy an occurrence threshold, the outlier state may be updated to be an expected outage state.

At block 320, the example watermark outage monitor 114 determines if state transitions in the sequence model represent expected outage state transitions or outlier state transitions based on updated probabilities associated with the state transitions. In some examples, the sequence model manager 210 determines whether probabilities associated with state transitions in the sequence model represent expected outage state transitions or outlier state transitions based on updated probabilities associated with the state transitions (e.g., as updated at block 312). For example, the sequence model manager 210 can determine whether probabilities associated with state transitions in the sequence model satisfy an occurrence probability threshold. In response to an outlier state transition satisfying the occurrence probability threshold, it can be updated to be an expected outage state transition.

The example machine readable instructions 300 continue in FIG. 3B. With reference to the preceding figures and associated descriptions, the example machine readable instructions continue with the example watermark outage monitor 114 selecting a watermark outage from the watermark outage data to evaluate for the grouping model (Block 322). In some examples, the grouping model manager 216 selects a watermark outage from the watermark outage data to evaluate for inclusion in the grouping model. When selecting watermark outages for addition to the grouping model, the grouping model manager 216 can select watermark outages in any order.

At block 324, the example watermark outage monitor 114 determines whether the selected watermark outage falls into an existing cluster. In some examples, the grouping model manager 216 determines and/or accesses a duration value and/or an onset value associated with the selected watermark outage and compares it to durations and/or onset values associated with clusters in a Markov model. For example, the grouping model manager 216 can determine whether a duration associated with the selected watermark outage is within a threshold of an existing cluster in the grouping model. In response to the selected watermark outage falling into an existing cluster, processing transfers to block 326. Conversely, in response to the selected watermark not falling into an existing cluster, processing transfers to block 332.

At block 326, the example watermark outage monitor 114 adds the selected watermark outage to the cluster. In some examples, the grouping model manager 216 adds the selected watermark outage to the existing cluster that the selected watermark falls into by storing the watermark outage duration and/or onset time in association with the cluster. In some examples, the grouping model manager 216 stores a time when the watermark outage occurred, which can be useful when determining if the watermark outage remains within the sliding time window in the future. In some examples, the grouping model manager 216 stores an indication that an additional duration falling within a cluster has occurred (e.g., by incrementing a count of watermark outages that have had a duration falling within a cluster).

At block 328, the example watermark outage monitor 114 determines whether there are any additional watermark outages to add to the model. In some examples, the grouping model manager 216 determines, based on the watermark outage data (e.g., the watermark outage data accessed at block 302) whether there are any watermark outages to add to the grouping model (e.g., any watermark outages not currently represented by the grouping model). In response to there being watermark outages to add to the grouping model, processing transfers to block 322 to select a new watermark outage to evaluate for the grouping model. Conversely, in response to there not being watermark outages to add to the grouping model, processing transfers to block 330.

At block 330, the example watermark outage monitor 114 removes any outlier watermark outages that are outside the sliding time window from the grouping model. In some examples, the grouping model manager 216 removes any outlier watermark outages from the grouping model that are no longer within the sliding time window. In some examples, the grouping model manager 216 can additionally delete non-outlier watermark outages when they have fallen outside of the sliding time window.

At block 332, the example watermark outage monitor 114 stores the selected watermark outage as an outlier. In some examples, the grouping model manager 216 stores the selected outage as an outlier, and additionally stores the time that the watermark outage occurred in association with the outlier to enable future pruning when the outlier is no longer within the sliding time window (e.g., at block 330).

At block 334, the example watermark outage monitor 114 determines whether a plurality of outliers exists within a threshold duration of the selected watermark outage that represent a new expected cluster. In some examples, the grouping model manager 216 determines whether a plurality of outliers exist within a threshold duration and/or a threshold onset time of the selected outage that represent a new expected cluster. For example, if a first outlier has a duration of ten minutes, and there are three outliers having durations within a minute of the first outlier, the grouping model manager 216 can determine whether (1) these four outliers are sufficiently similar with respect to outage duration and/or onset time to form an expected cluster, and (2) whether the four outliers constitute a sufficient quantity of outliers to form an expected cluster. In some examples, the grouping model manager 216 can determine whether a new expected cluster exists at a regular interval (e.g., once a day, once a week, etc.), in response to an action (e.g., a user requesting that the grouping model be updated, etc.), or at any other time.

At block 336, the example watermark outage monitor 114 creates a new cluster. In some examples, the grouping model manager 216 creates a new cluster with the outliers which are within a threshold distance of each other, and which satisfy a quantity of outliers required to form a cluster.

Example machine readable instructions 400 that may be executed by the example watermark outage monitor 114 to analyze a detected watermark encoding outage and determine if a watermark outage alert should be generated are illustrated in FIG. 4. With reference to the preceding figures and associated descriptions, the example machine readable instructions 400 begin with the example watermark outage monitor 114 accessing a media signal (block 402). In some examples, the media receiver 202 accesses the watermarked media signal 108.

At block 404, the example watermark outage monitor 114 detects a new watermark encoding outage in the media signal. In some examples, the watermark detector 204 can detect a new watermark encoding outage in the media signal as the media is being received by the media receiver 202. The example watermark detector 204 can perform live monitoring to collect watermark outage data and initiate processes to issue watermark outage alerts when necessary.

At block 406, the example watermark outage monitor 114 determines an onset time for the new watermark encoding outage. In some examples, the watermark detector 204 can determine an onset time for the new watermark encoding outage by recording a timestamp associated with the time at which watermarks are no longer detected in the watermarked media signal 108 (e.g., representing the start of an outage). In some examples, the watermark outage monitor 114 determines an onset time for the new watermark encoding outage by determining an elapsed time since a previous watermark encoding outage.

At block 408, the example watermark outage monitor 114 accesses a previous watermark encoding outage onset time. In some examples, the sequence model evaluator 212 accesses a previous watermark encoding outage onset time by determining the previous watermark outage evaluated by the sequence model evaluator 212 and retrieving the onset time associated with this previous watermark outage. In some examples where the onset time is an elapsed time since the previous watermark outage, block 408 can be bypassed, and processing transfers directly from block 406 to block 410.

At block 410, the example watermark outage monitor 114 determines whether the new watermark outage onset time and the previous watermark outage onset time correspond to a state transition in the sequence model. In some examples, the example sequence model evaluator 212 determines whether the new watermark outage onset time (e.g., of the watermark outage detected at block 404) and the previous watermark outage onset time correspond to a state transition in the sequence model. In some examples where the new watermark outage onset time is an elapsed time since the previous watermark outage, the watermark outage monitor determines whether the new watermark outage onset time corresponds to a state in the sequence model. In response to the new watermark outage onset time and the previous watermark outage onset time corresponding to a state transition in the sequence model, processing transfers to block 412. Conversely, in response to the new watermark outage onset time and the previous watermark outage onset time not corresponding to a state in the sequence model, processing transfers to block 418.

At block 412, the example watermark outage monitor 114 determines whether the state transition is an expected outage state transition. In some examples, the sequence model evaluator 212 determines whether the state transition is an expected outage state transition based on data (e.g., a label associated with the transition) stored in the sequence model. In some examples, the sequence model evaluator 212 can determine whether the state transition is an expected outage state transition based on a probability associated with the state transition satisfying an occurrence probability threshold. In response to the state transition being an expected outage state transition, processing transfers to block 414. Conversely, in response to the state transition not being an expected outage state transition, processing transfers to block 418.

At block 414, the example watermark outage monitor 114 accesses a duration of the new watermark encoding outage. In some examples, the grouping model evaluator 218 accesses a duration of the new watermark encoding outage. In some examples, the duration may be determined by the watermark detector 204.

At block 416, the example watermark outage monitor 114 determines whether the new watermark encoding outage falls into an existing cluster of the outage grouping model. In some examples, the grouping model evaluator 218 determines whether the duration and/or onset time of the new watermark encoding outage falls into an existing cluster of the outage grouping model by determining whether the duration and/or onset time of the new watermark encoding outage is within a threshold range of durations and/or onset times corresponding to an existing cluster in the outage grouping model.

At block 418, the example watermark outage monitor 114 generates a watermark encoding outage alert. In some examples, the alert generator 220 generates a watermark encoding outage alert to indicate that an unexpected watermark outage has been observed. The watermark encoding outage alert generated by the alert generator 220 can have any form (e.g., an email or other message, an entry in data log, an indication on a computing device, etc.). In some examples, the watermark outage alert 116 can additionally or alternatively be a signal or command to reset the watermark encoder 106 or otherwise reset the operation of the watermark encoder 106 to a known operating state.

At block 420, the example watermark outage monitor 114 labels the new watermark encoding outage as an expected watermark outage. In some examples, the alert generator 220 labels the new watermark encoding outage as an expected watermark outage. In some examples, the alert generator 220 takes no action to specifically label the new watermark encoding outage as expected, but somehow indicates that a watermark encoding outage alert does not need to be issued (e.g., labeling the watermark outage as already-processed, deleting the watermark outage from the pending/processing queue, etc.).

FIGS. 5A-5E represent example watermark detection plots 500A, 500B, 500C, 500D, 500E for a portion of an example data collection period. For example, the watermark detection plots 500A, 500B, 500C, 500D, 500E each represent one hour of time in a data collection period including multiple hours of data, and represent watermark outages in one or more media signal(s) analyzed by the watermark outage monitor 114. The time periods represented by the example watermark detection plots 500A, 500B, 500C, 500D, 500E represent different combinations of watermark outage onset times that may be observed in an example data collection period. The watermark monitor 114 can divide the data collection period into any interval when performing onset time analysis, or alternatively analyze the entire data collection period as a whole, with a start time of zero minutes and an end time corresponding to a time at which the media signal(s) concluded. The watermark detection plots 500A, 500B, 500C, 500D, 500E include time axes spanning horiznotally across the plots, beginning at zero minutes on the left end and concluding at sixty minutes on the right end. The vertical axes include a discrete indication of whether the media signal included watermarks at a given time, or did not include watermarks at the given time.

Figure 5A:
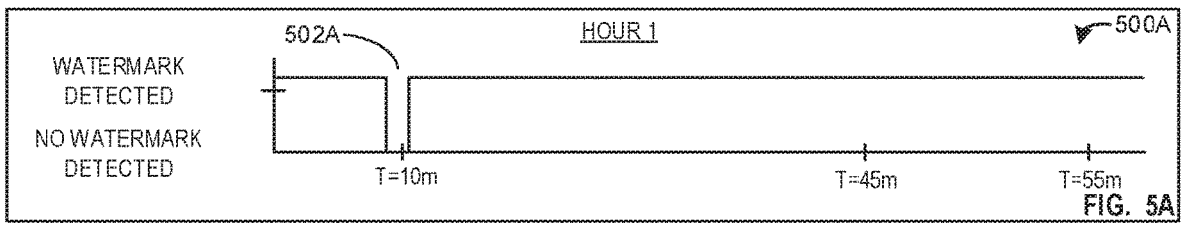
FIGS. 5A-5E represent example watermark detection plots for a portion of an example data collection period.

A first watermark detection plot 500A of the illustrated example of FIG. 5A indicates that watermarks were detected throughout the hour period (e.g., "Hour 1"), except for at a first ten-minute onset time watermark outage 502A. The first ten-minute onset time watermark outage 502A has an onset time slightly before ten minutes, at approximately eight minutes. However, for simplicity, watermark outages with onset times generally around ten minutes are referred to as ten-minute onset time watermark outages. Similarly, all of the watermark outages represented in the watermark detection plots 500A, 500B, 500C, 500D, 500E, are described with approximate onset times, and are rounded to a central value associated with the plurality of watermark outage onset times (e.g., ten minutes, forty-five minutes, fifty-five minutes, etc.) for simplicity. In some examples, the onset times associated with the watermark outages could be defined as elapsed times since a previous watermark outage, as opposed to discrete times. The first ten-minute onset time watermark outage 502A has a duration of approximately two minutes.

Figure 5B:
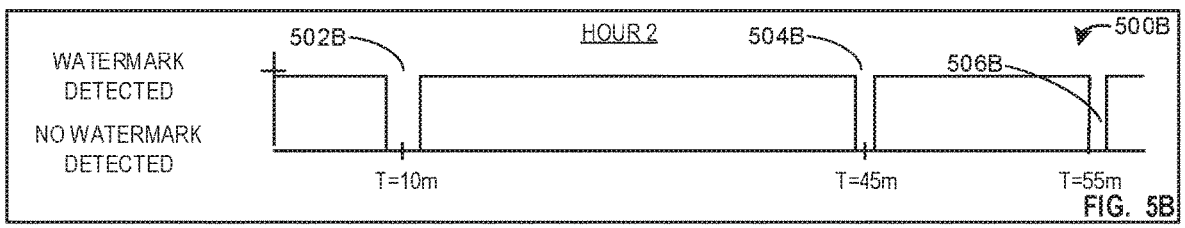

A second watermark detection plot 500B of the illustrated example of FIG. 5B indicates that there was a second ten-minute onset time watermark outage 502B detected during this time period (e.g., "Hour 2"), as well as a first forty-five-minute onset time watermark outage 504B and a first fifty-five-minute watermark outage 506B detected during this time period. In examples where watermark outage onset times are elapsed times since previous watermark outages, the first forty-five-minute onset time watermark outage 504b has an onset time of thirty-five minutes. Similarly, the first fifty-five-minute watermark outage 506b has an onset time of ten minutes when onset time is determined based on elapsed times since the previous watermark outage. The duration of the second ten-minute onset time watermark outage 502B is slightly longer than the duration of the first ten-minute onset time watermark outage 502A.

Figure 5C:
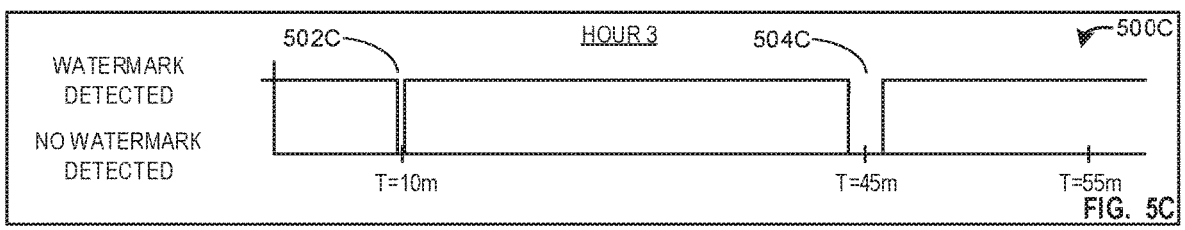

A third watermark detection plot 500C of the illustrated example of FIG. 5C indicates that there was a third ten-minute onset time watermark outage 502C detected during this time period (e.g., "Hour 3"), as well as a forty-five-minute onset time watermark outage 504C detected during this time period. The third ten-minute onset time watermark outage 502C has a shorter duration than the first and second ten-minute onset time watermark outages 502A, 502B, and the second forty-five-minute onset time watermark outage 504C has a longer duration than the first forty-five-minute onset time watermark outage 504B. In some examples, watermark outage durations can have significant variance, which in some cases can limit the accuracy with which duration can be used independently to identify unexpected watermark outages. In such examples, a combined approach of analyzing watermark outage onset times and watermark outage durations can be especially beneficial in issuing accurate watermark outage alerts. Additionally, to account for variance in onset times of watermark outages, clustering can be utilized to cluster similar onset times (e.g., 502A, 502B, 502C, etc.).

Figure 5D:
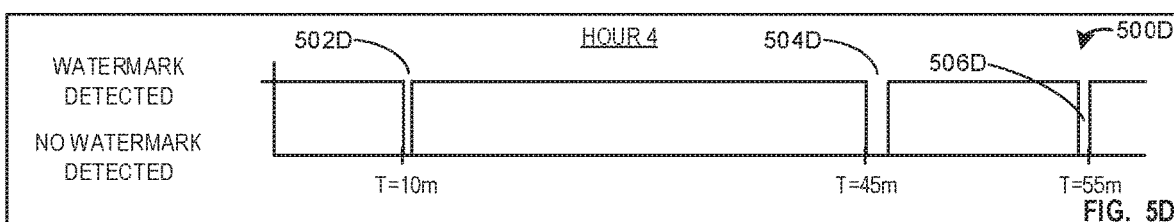

A fourth watermark detection plot 500D is depicted in the illustrated example of FIG. 5D. The fourth watermark detection plot 500D indicates that there was a fourth ten-minute onset time watermark outage 502D detected during this time period (e.g., "Hour 4"), a third forty-five-minute onset time watermark outage 504D, and a second fifty-five-minute onset time watermark outage 506D detected during the time period.

Figure 5E:
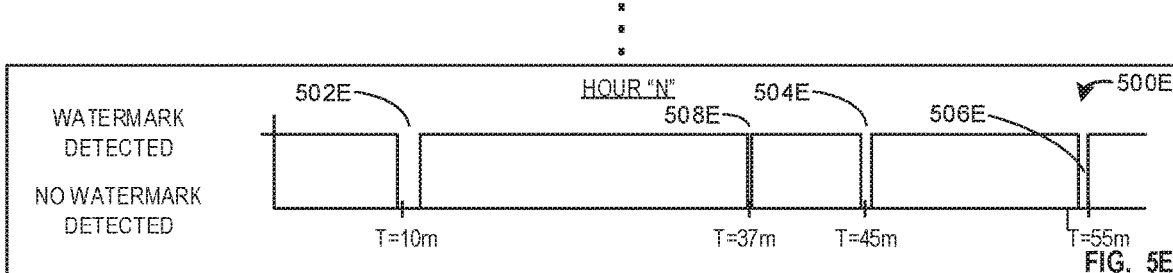
Figure 5F:
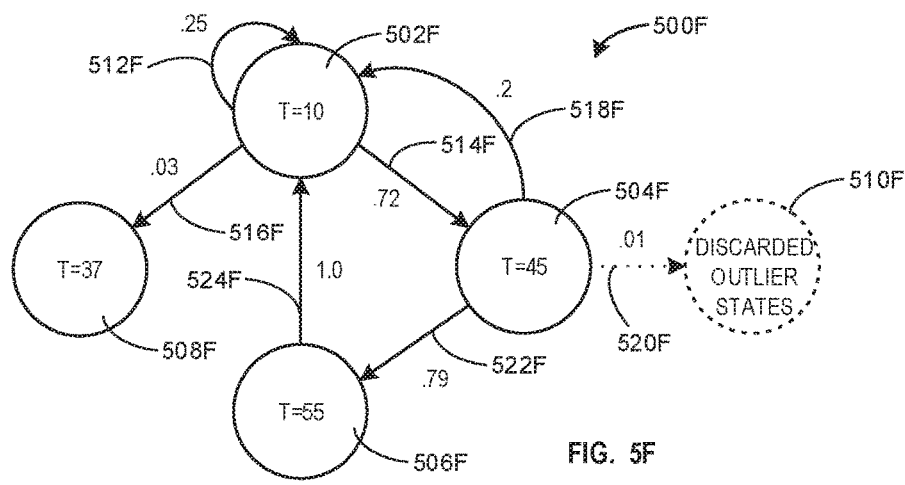
FIG. 5F is a state diagram based on the data collection period of the watermark detection plots of FIGS. 5A-5E.

A fifth watermark detection plot 500E of the illustrated example of FIG. 5E indicates that there was a fifth ten-minute onset time watermark outage 502E, as well as a fourth forty-five-minute onset time watermark outage 504E, a third fifty-five-minute onset time watermark outage 506E and a first thirty-seven-minute onset time watermark outage 508E detected during this time period (e.g., "Hour N"). The first thirty-seven-minute onset time watermark outage 508E does not correspond to an onset time of any of the other watermark detection plots 500A, 500B, 500C, 500D, 500E. This may indicate that the first thirty-seven-minute onset time watermark outage 508E corresponds to an outlier watermark outage, unless other portions of the example data collection period include additional thirty-seven-minute onset time watermark outages sufficient to satisfy an occurrence threshold.

FIG. 5F is a state diagram 500F based on the data collection period of the watermark detection plots of FIGS. 5A-5E. The state diagram 500F includes a plurality of states 502F, 504F, 506F, 508F, 510F and state transitions 512F, 514F, 516F, 518F, 520F, 522F, 524F. In some examples, the state diagram 500F is representative of a Markov model.

The states 502F, 504F, 506F, 508F, 510F of the state diagram 500F are associated with various onset times from the example data collection period of the watermark detection plots of FIGS. 5A-5E. The first state 502F corresponds to watermark outages with an onset time of ten minutes, such as the first ten-minute onset time watermark outage 502A, the second ten-minute onset time watermark outage 502B, etc. The second state 504F corresponds to watermark outages with an onset time of forty-five minutes, such as the first forty-five-minute onset time watermark outage 504B, the second forty-five-minute onset time watermark outage 504C, etc. The third state 506F corresponds to watermark outages with an onset time of fifty-five minutes, such as the first fifty-five-minute onset time watermark outage 506B, the second fifty-five-minute onset time watermark outage 506D, etc. The fourth state 508F corresponds to watermark outages with an onset time of thirty-seven minutes, such as the first thirty-seven minute-onset time watermark outage 508E. In some examples, the states 502F, 504F, 506F, 508F, 510F can be defined by onset times equal to elapsed times since previous watermark outages. For example, if the states 502F, 504F, 506F, 508F, 510F are defined by elapsed times since previous watermark outages, the fourth state 506F can be associated with an onset time of ten minutes, as the watermark outages at fifty-five minutes are preceded by a watermark outage at forty-five minutes in the watermark outage plots of FIGS. 5A-5E, resulting in an onset time of ten minutes (e.g., ten minutes preceding the fifty-five minute watermark outage since the previous watermark outage) for the fourth state 506F. In some examples, any of these states 502F, 504F, 506F, 508F can be determined to be expected outage states and/or outlier states, depending on whether there are sufficient occurrences of watermark outages with onset times corresponding to the respective states to satisfy an occurrence threshold.

The state diagram 500F additionally includes a fifth state 510F that is associated with discarded outlier states. For example, when data associated with an outlier state is no longer within the sliding time window, these outlier states may be "discarded." In some examples, these outlier states are permanently deleted from the sequence model. In the example state diagram 500F, the fifth state 510F remains in the model, and has an associated state transition 520F with a corresponding probability of transition to the fifth state 510F. Upon updating the model, this fifth state 510F can be deleted, and the corresponding state transition 520F can be deleted as well, updating probabilities associated with other state transitions in the process (e.g., updating the probabilities associated with state transitions 522F and 518F).

The state diagram 500F includes state transitions 512F, 514F, 516F, 518F, 520F, 522F, 524F. The first transition 512F is associated with consecutive watermark outages having onset times of ten minutes, resulting in the first state 502F occurring twice, consecutively. For example, if two consecutive hours with watermark outage data corresponding to the first watermark detection plot 500A occurred, two of the first ten-minute onset time watermark outages 502A would occur consecutively, corresponding to the first transition 512F. The first state transition 512F has a probability of 0.25, representing a twenty five percent chance, according to the sequence model, of the state transition occurring when at the first state 502F.

The second state transition 514F is associated with transitioning from the first state 502F to the second state 504F. For example, the second watermark detection plot 500B includes the second ten-minute onset time watermark outage 502B followed by the first forty-five-minute onset time watermark outage 504B, corresponding to the second state transition 514F. The second state transition 514F has a probability of 0.72, representing a seventy two percent chance, according to the sequence model, of the second state transition 514F occurring when at the first state 502F.

The third state transition 516F is associated with transitioning from the first state 502F to the fourth state 508F. For example, the fifth watermark detection plot 500E includes the fifth ten-minute onset time watermark outage 502E followed by the first thirty-seven-minute onset time watermark outage 508E, corresponding to the third state transition 516F. The third state transition 516F has a probability of 0.01, representing a one percent chance, according to the sequence model, of the third state transition 516F occurring when at the first state 502F. In some examples, this probability may not satisfy an occurrence probability threshold, resulting in the third state transition 516F being an outlier state transition. In such examples, an occurrence of the third state transition 516F may result in the alert generator 220 of the watermark outage monitor 114 issuing a watermark outage alert 116.

The fourth state transition 518F is associated with transitioning from the second state 504F to the first state 502F. For example, if two consecutive hours with watermark outage data corresponding to the third watermark detection plot 500C occurred, an instance of the second forty-five-minute onset time watermark outage 504C would be followed by an instance of the third ten-minute onset time watermark outage 502C, corresponding to the fourth transition 518F. The fourth state transition 518F has a probability of 0.2, representing a twenty percent chance, according to the sequence model, of the fourth state transition 518F occurring when at the second state 504F.

The fifth state transition 520F is associated with transitioning from the second state 504F to the fifth state 510F, which represents discarded outlier states. The fifth state transition 520F has a probability of 0.01, representing a one percent chance, according to the sequence model, of the fifth state transition 520F occurring when at the second state 504F.

The sixth state transition 522F is associated with transitioning from the second state 504F to the third state 506F. For example, in the second watermark detection plot 500B, the first forty-five-minute onset time watermark outage 504B is followed by the first fifty-five-minute onset time watermark outage 506B, corresponding to the sixth state transition 522F. The sixth state transition 522F has a probability of 0.79, representing a seventy-nine percent chance, according to the sequence model, of the sixth state transition 522F occurring when at the second state 504F.

The seventh state transition 524F is associated with transitioning from the third state 506F to the first state 502F. For example, if two consecutive hours with watermark outage data corresponding to the second watermark detection plot 500B occurred, an instance of the first fifty-five-minute onset time watermark outage 506B would be followed by an instance of the second ten-minute onset time watermark outage 502B, corresponding to the seventh state transition 524F. The seventh state transition 524F has a probability of 1.0, representing a one-hundred percent chance, according to the sequence model, of the seventh state transition 524F occurring when at the third state 506F. This one-hundred percent chance indicates that in all of the data observed and incorporated into the model, an occurrence of the third state 506F resulted in a transition to the first state 502F.

FIG. 6A includes an example first outage duration plot 600A including two example outage onset times associated with similar durations, represented by two outage clusters. The outage duration plots 600A, 600B, 600C of FIGS. 6A-6C include horizontal axes for plotting watermark outage durations, and vertical axes for representing discrete onset times of watermark outages. The vertical axis of the first outage duration plot 600A includes two onset times (e.g., associated with two states in a Markov model): a first onset time 602 of ten minutes and a second onset time 604 of forty-five minutes. For example, the first onset time 602 can be associated with the first state 502F of the state diagram 500F of FIG. 5F. Similarly, the second onset time 604 can be associated with the second state 504F of the state diagram 500F of FIG. 5F. A plurality of watermark outage durations are plotted for the first onset time 602 and the second onset time 604. For example, a first watermark outage duration 606 is associated with a watermark outage that had an onset time of ten minutes (e.g., associated with the ten-minute onset time state in the Markov model). Similarly, a second watermark outage duration 608 that is shorter than the first watermark outage duration 606 is associated with a watermark outage that had an onset time of ten minutes. When a clustering algorithm is utilized to cluster the watermark outage data of the first outage duration plot 600A, a first cluster 610 includes all of the watermark outages in both the first onset time 602 and the second onset time 604, as represented by the two dotted vertical lines representing the edges (e.g., limits) of the cluster. A second cluster 612 includes four watermark outages having an onset time of forty-five minutes, and a duration approximately the same as the duration of watermark outages associated with the first cluster 612. The example clustering technique illustrated in FIGS. 6A-6C and 7A-7B performs clustering based on onset times (e.g., elapsed times since a previous outage or discrete times) and durations associated with watermark outages. In some examples, clustering could be performed on duration alone, enabling clusters that include watermark outages with a variety of onset times.

In the example outage duration plot 600A, the data is highly predictable, in that all of the watermark durations are very similar. When comparing newly detected watermark outages to a grouping model constructed for the data associated with the first outage duration plot 600A, an outlier can be detected if a duration and onset time combination of the watermark outage does not correspond to the first cluster 610 or the second cluster 612.

FIG. 6B is an example second outage duration plot 600B including three example watermark outage clusters. In addition to the first onset time 602 and the second onset time 604, the watermark outage data represented in the second outage duration plot 600B includes a third onset time 614 of fifty-five minutes. The third onset time 614 can be associated with the third state 506F of the state diagram 500F of FIG. 5F. The third onset time 614 includes a plurality of watermark outage durations having a duration longer than the watermark outages of the first cluster 610 and the second cluster 612. When a clustering algorithm is utilized to cluster the watermark outage duration data of the second outage duration plot 600B, a third cluster 616 includes the watermark outages having the third onset time 614 and durations longer than the first cluster 610 and the second cluster 612. In this example, despite there being additional watermark outages having a different onset time and duration associated with the third cluster 616, the data is very predictable in that each of the onset times 602, 604, 614 include watermark outages that have duration values that are similar to one another. Hence, when the watermark outage monitor 114 analyzes a detected watermark outage against the sequence model and the grouping model, it can clearly determine whether the detected watermark outage has an onset time corresponding to the onset times 602, 604, 614 and then, determine whether the watermark outage has a duration associated with one of the clusters 610, 612, 616. In some examples (e.g., as illustrated in FIGS. 7A-7B), an onset time may be associated with more than one cluster due to watermark outages having different durations but the same onset time. In such examples, it may be more challenging or time-consuming to determine an outlier watermark outage, as an alarm cannot be triggered with confidence based on an onset time until a longest duration associated with the clusters corresponding to the onset time has passed. A hidden node analysis can be performed in these less-predictable situations to attempt to identify a more predictable clustering solution.

The watermark outage monitor can additionally or alternatively determine whether the detected watermark outage has a duration falling into one of the clusters 610, 612, 616 associated with the onset times 602, 604, 614. For example, in response to detecting a watermark outage with the third onset time 614 that has a watermark outage duration corresponding to the first cluster 610 and the second cluster 612, the watermark outage monitor 114 may determine that an alert should be generated, as the third onset time 614 is associated with the second cluster 616.

The second outage duration plot 600B additionally includes a duration alarm threshold 618 representative of an example threshold that can be implemented to limit the maximum duration of an expected watermark outage duration. For example, the duration alarm threshold 618 is configured to a value slightly higher than the upper duration edge (e.g., limit) of the third cluster 616, such that if a watermark outage continues beyond the duration alarm threshold 618, the watermark outage monitor 114 can issue an alarm, as no cluster has a duration exceeding the duration alarm threshold 618. In some examples, a plurality of duration alarm thresholds can be implemented that are associated with different clusters. For example, if a watermark outage is detected that has an onset time corresponding to the first onset time 602, based on the first onset time 602 being associated only with the first cluster 610, a duration alarm threshold could be utilized with a value that is slightly higher than the upper duration edge (e.g., limit) of the first cluster 610.

FIG. 6C is an example third outage duration plot 600C depicting an outlier duration 620 exceeding the example duration alarm threshold 618. The third outage duration plot 500C includes a watermark outage associated with the third onset time 614. However, the watermark outage has a duration exceeding the duration associated with the third cluster 616, which is the only cluster associated with the third onset time 614. Therefore, the watermark monitor 114 identifies the detected watermark outage as an outlier watermark outage based on the watermark outage having a onset time and duration combination that does not correspond to the any of the clusters 610, 612, 616. Additionally or alternatively, the watermark monitor 114 can identify the detected watermark outage as an outlier watermark outage based on the duration associated with the outage exceeding the duration alarm threshold 618.

FIG. 7A is an example fourth outage duration plot 700A including watermark outages represented by a plurality of clusters. The fourth outage duration plot 700A includes the first onset time 602, the second onset time 604, and the third onset time 614. The watermark outage data represented by the fourth outage duration plot 700A is different than the data of the first, second, and third outage duration plots 600A, 600B, 600C. In contrast to the watermark outage data of the first, second, and third outage duration plots 600A, 600B, 600C, the watermark outage data of the fourth outage duration plot 700A includes watermark outage durations falling into different clusters, but with the same onset times. For example, the second onset time 604 includes some watermark outage durations falling into a second cluster 704 and some watermark outage durations falling into a third cluster 706. Similarly, the third onset time 614 includes some watermark outage durations falling into a fourth cluster 708 and some watermark outage durations falling into a fifth cluster 710. Conversely, for example, the first onset time 602 has all watermark outage durations falling into a first cluster 702. The watermark monitor 114 can determine whether a duration associated with the first onset time 602 corresponds to an expected duration by determining whether it falls into the first cluster 702, but it may have difficulty determining whether a duration associated with the second onset time 604 or the third onset time 614 are expected due to these onset times being associated with more than one cluster. In some examples, the watermark monitor 114 can reorganize the sequence model and/or the grouping model to enable a more predictable and/or more accurate model.

FIG. 7B is an example outage duration plot 700B representing the outage data of FIG. 7A reorganized in an adjusted model. The example adjusted model represents one possible solution to reorganizing the watermark outages by determining more specific onset times from a larger time resolution that are associated with the clusters 704, 706, 708, 710. The model(s) can alternatively be adjusted or reorganized in any manner to introduce more regularity (e.g., predictability) into the model to enable the watermark monitor 114 to accurately evaluate detected watermark outages against the model(s) and to set tighter tolerances for alarm duration thresholds and cluster edges. Specifically, clusters which are associated with a unique combination of onset time and duration can enable enhanced predictability and speed of analysis of a detected watermark outage.

The outage duration plot 700B includes the first onset time 602, with the same watermark outage durations included in this first onset time 602, since reorganization is not required for these watermark outages (e.g., all of the watermark outages in the data with this onset time have durations corresponding to the same cluster). The outage duration plot 700B includes a fifth onset time 712 and a sixth onset time 714, corresponding to two separate onset times that help explain the different durations represented in the second onset time 604. In this example, the fifth onset time 712 corresponds to an onset time of forty-five minutes occurring in a first hour, and the sixth onset time 714 corresponds to an onset time of forty-five minutes occurring in a second, consecutive, hour. Hence, the sixth onset time 714 can additionally be referred to as being one-hundred-and-five minutes in a two hour sample period. This could occur, for example, if a first hour of programming has a different advertisement scheduling configuration which has shorter advertisements, than a second hour of programming. The watermark outages of the fifth onset time 712 have durations corresponding to the second cluster 704, and the watermark outages of the sixth onset time 714 have durations corresponding to the third cluster 706. While discrete times (e.g., forty-five minutes into a first hour) are utilized in some descriptions throughout FIGS. 6A-6C and 7A-7B for simplicity, the onset times can be elapsed times, representing times since a previous watermark outage.

Similarly, the outage duration plot 700B includes a seventh onset time 716 and an eighth onset time 718, corresponding to two separate onset times that help explain the different durations represented by the third onset time 614. In this example, the seventh onset time 716 corresponds to an onset time of fifty-five minutes occurring in a first hour, and the eighth onset time 718 corresponds to an onset time of fifty-five minutes occurring in a second, consecutive, hour. The eighth onset time 718 can also be referred to as being one-hundred-and-fifteen minutes in a two-hour programming period. With this reorganization, the watermark outages of the seventh onset time 716 have durations corresponding to the fourth cluster 708, and the watermark outages of the eighth onset time 718 have durations corresponding to the fifth cluster 710.

Figure 8:
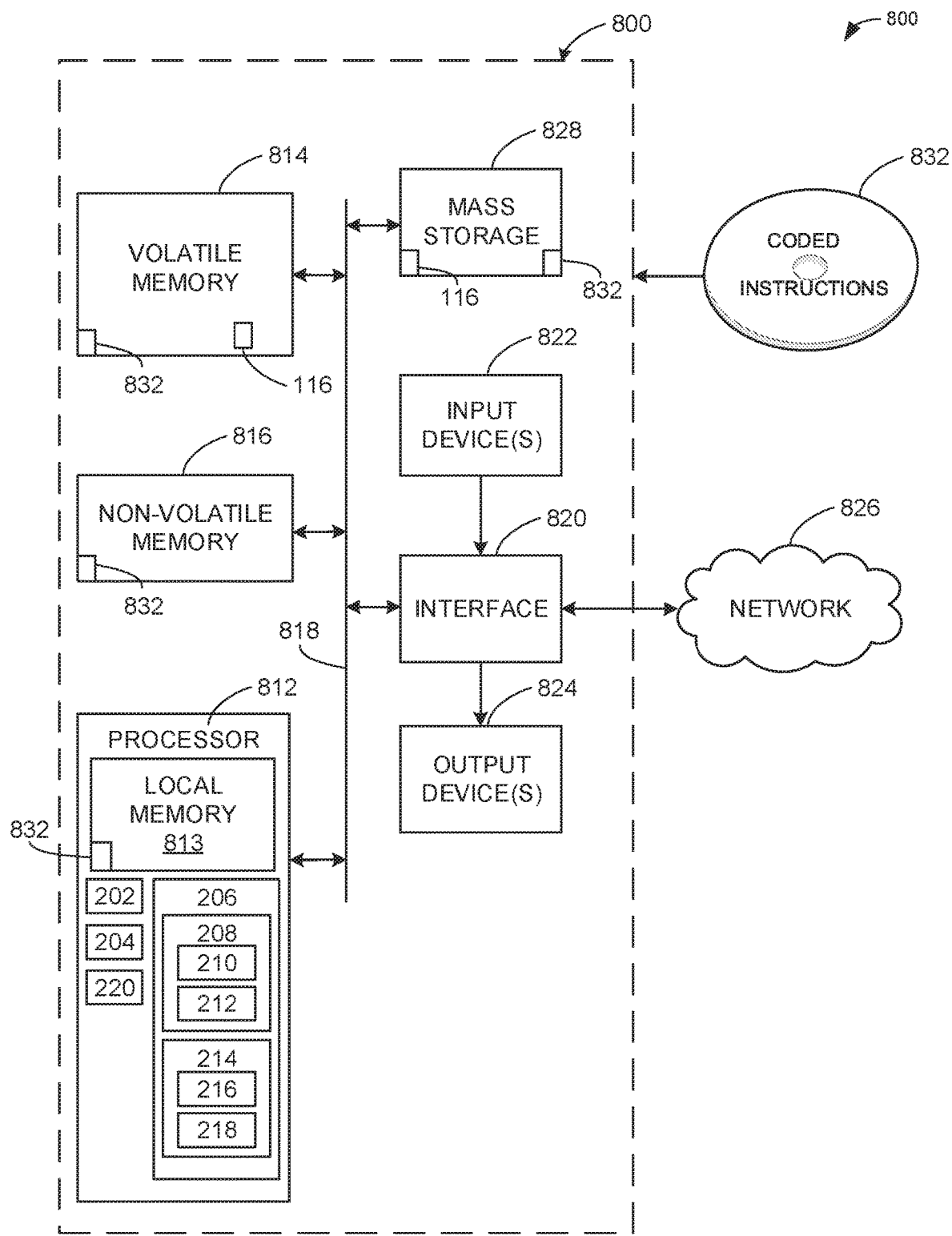
FIG. 8 is a block diagram of an example processor platform structured to execute the example machine readable instructions of FIGS. 3A-B and/or 4 to implement the example watermark outage monitor of FIGS. 1-2.

FIG. 8 is a block diagram of an example processor platform 800 structured to execute the instructions of FIGS. 3A, 3B, and 4 to implement the watermark outage monitor 114 of FIGS. 1 and 2. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example media receiver 202, the example watermark detector 204, the example outage analyzer 206, the example sequence analyzer 208, the example sequence model manager 210, the example sequence model evaluator 212, the example grouping analyzer 214, the example grouping model manager 216, the example grouping model evaluator 218, the example alert generator 220 and/or, more generally, the example watermark outage monitor 114 of FIG. 1.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIGS. 3A, 3B, and 4 may be stored in the mass storage device 828, in the volatile memory 814, in the non-volatile memory 816, and/or on a removable non-transitory computer readable storage medium such as a CD or DVD.

From the foregoing, it will be appreciated that example methods, apparatus and articles of manufacture have been disclosed that enable accurate watermark outage alert issuance by generating and updating models in association with parameters of watermark outages. Examples disclosed herein enable accurate watermark outage alerts by comparing onset times and/or durations associated with detected watermark outages with models associated with these parameters to determine whether the detected watermark outage is an expected outage. Such techniques reduce the likelihood of unnecessary watermark outage alerts (e.g., false alarms), which are prevalent in conventional approaches that may issue watermark outages during commercials, programming breaks, or other intentionally non-watermarked portions of media signals.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A watermark outage monitoring apparatus comprising:
   an outage analyzer to evaluate an onset time and duration of a detected watermark outage based on a model of expected watermark outages to determine whether the detected watermark outage corresponds to at least one of the expected watermark outages represented in the model; and
   an alert generator to generate an alert in response to the outage analyzer having determined the detected watermark outage does not correspond to at least one of the expected watermark outages included in the model, the alert generator to suppress the alert in response to the outage analyzer having determined the detected watermark outage corresponds to the at least one of the expected watermark outages represented in the model.

2. The watermark outage monitoring apparatus of claim 1, wherein the model of expected watermark outages includes:
   expected outage states corresponding to onset times of the expected watermark outages; and
   state transitions between the expected outage states, the state transitions representing probabilities of transitioning between respective pairs of the expected outage states represented in the model.

3. The watermark outage monitoring apparatus of claim 1, wherein the model includes outlier states associated with watermark outage onset times that do not satisfy an occurrence threshold associated with expected outage states.

4. The watermark outage monitoring apparatus of claim 2, wherein respective ones of the expected outage states further correspond to the onset times and durations of respective ones of the expected watermark outages represented in the model.

5. The watermark outage monitoring apparatus of claim 2, wherein to evaluate the onset time and the duration of the detected watermark outage, the outage analyzer is to:
   determine whether the onset time of the detected watermark outage corresponds to an elapsed time between respective ending and beginning expected outage states connected by at least one of the state transitions; and
   determine whether the duration of the detected watermark outage corresponds to a cluster of durations and onset times of expected outages.

6. The watermark outage monitoring apparatus of claim 5, wherein when (a) the onset time of the detected watermark outage corresponds to respective ending and beginning expected outage states connected by at least one of the state transitions and (b) the duration and onset times of the detected watermark outage corresponds to a cluster of durations and onset times of expected outages, the outage analyzer is to determine that the detected watermark outage corresponds to at least one of the expected watermark outages.

7. The watermark outage monitoring apparatus of claim 5, wherein when (a) the onset time of the detected watermark outage does not correspond to respective ending and beginning expected outage states connected by at least one of the state transitions or (b) the duration of the detected watermark outage does not correspond to a cluster of durations and onset times of expected outages, the outage analyzer is to determine that the detected watermark outage does not correspond to at least one of the expected watermark outages.

8. The watermark outage monitoring apparatus of claim 3, wherein a first one of the outlier states is eliminated from the model when at least one of a sliding time window period has passed or the first one of the outlier states becomes a new expected outage state after satisfying the occurrence threshold.

9. A non-transitory computer readable storage medium comprising computer readable instructions that, when executed, cause a processor to at least:
   evaluate an onset time and duration of a detected watermark outage based on a model of expected watermark outages to determine whether the detected watermark outage corresponds to at least one of the expected watermark outages represented in the model; and
   generate an alert in response to having determined the detected watermark outage does not correspond to at least one of the expected watermark outages included in the model, the alert to be suppressed in response to having determined the detected watermark outage corresponds to the at least one of the expected watermark outages represented in the model.

10. The non-transitory computer readable storage medium of claim 9, wherein the model of expected watermark outages includes:
    expected outage states corresponding to onset times of the expected watermark outages; and
    state transitions between the expected outage states, the state transitions representing probabilities of transitioning between respective pairs of the expected outage states represented in the model.

11. The non-transitory computer readable storage medium of claim 9, wherein the model includes outlier states associated with watermark outage onset times that do not satisfy an occurrence threshold associated with expected outage states.

12. The non-transitory computer readable storage medium of claim 10, wherein respective ones of the expected outage states further correspond to the onset times and durations of respective ones of the expected watermark outages represented in the model.

13. The non-transitory computer readable storage medium of claim 10, wherein to evaluate the onset time and the duration of the detected watermark outage, the computer readable instructions cause the processor to:
  determine whether the onset time of the detected watermark outage corresponds to an elapsed time between respective ending and beginning expected outage states connected by at least one of the state transitions; and
  determine whether the duration of the detected watermark outage corresponds to a cluster of durations and onset times of expected outages.

14. The non-transitory computer readable storage medium of claim 13, wherein the computer readable instructions cause the processor to determine that the detected watermark outage corresponds to at least one of the expected watermark outages when (a) the onset time of the detected watermark outage corresponds to respective ending and beginning expected outage states connected by at least one of the state transitions and (b) the duration of the detected watermark outage corresponds to a cluster of durations and onset times of expected outages.

15. The non-transitory computer readable storage medium of claim 13, wherein the computer readable instructions cause the processor to determine that the detected watermark outage does not correspond to at least one of the expected watermark outages when (a) the onset time of the detected watermark outage does not correspond to respective ending and beginning expected outage states connected by at least one of the state transitions or (b) the duration of the detected watermark outage does not correspond to a cluster of durations and onset times of expected outages.

16. The non-transitory computer readable storage medium of claim 11, wherein the computer readable instructions, when executed, further cause the processor to eliminate a first one of the outlier states from the model when a sliding time window period has passed, or make the first one of the outlier states a new expected outage state after satisfying the occurrence threshold.

17. A method to detect watermark outages comprising:
  evaluating, by executing an instruction with a processor, an onset time and duration of a detected watermark outage based on a model of expected watermark outages to determine whether the detected watermark outage corresponds to at least one of the expected watermark outages represented in the model;
  generating, by executing an instruction with the processor, an alert in response to determining the detected watermark outage does not correspond to at least one of the expected watermark outages included in the model; and
  suppressing, by executing an instruction with the processor, the alert in response to determining the detected watermark outage corresponds to the at least one of the expected watermark outages represented in the model.

18. The method of claim 17, wherein the model of expected watermark outages includes:
  expected outage states corresponding to onset times of the expected watermark outages; and
  state transitions between the expected outage states, the state transitions representing probabilities of transitioning between respective pairs of the expected outage states represented in the model.

19. The method of claim 18, wherein respective ones of the expected outage states further correspond to the onset times and durations of respective ones of the expected watermark outages represented in the model.

20. The method of claim 18, wherein the evaluating of the onset time and the duration of the detected watermark outage includes:
  determining whether the onset time of the detected watermark outage corresponds to an elapsed time between respective ending and beginning expected outage states connected by at least one of the state transitions; and
  determining whether the duration of the detected watermark outage corresponds to a cluster of durations and onset times of expected outages.

* * * * *